United States Patent
Colavincenzo et al.

(10) Patent No.: US 10,630,137 B2
(45) Date of Patent: Apr. 21, 2020

(54) FRONT END MOTOR-GENERATOR SYSTEM AND MODULAR GENERATOR DRIVE APPARATUS

(71) Applicant: Bendix Commercial Vehicle Systems LLC, Elyria, OH (US)

(72) Inventors: David Colavincenzo, Castalia, OH (US); Fernando Venegas Diaz, Elyria, OH (US); Dennis Young, Sheffield Village, OH (US)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 293 days.

(21) Appl. No.: 15/842,495

(22) Filed: Dec. 14, 2017

(65) Prior Publication Data

US 2018/0166945 A1   Jun. 14, 2018

Related U.S. Application Data

(63) Continuation-in-part of application No. 15/378,139, filed on Dec. 14, 2016, now Pat. No. 10,220,830.

(51) Int. Cl.
*B60K 6/22*    (2007.10)
*H02K 7/00*    (2006.01)
(Continued)

(52) U.S. Cl.
CPC ............ *H02K 7/006* (2013.01); *B60K 6/24* (2013.01); *B60K 6/26* (2013.01); *B60K 6/30* (2013.01);
(Continued)

(58) Field of Classification Search
CPC ............ H02K 7/006; H02K 7/00; H02K 7/18; H02K 7/1815; H02K 7/116; B60K 6/387;
(Continued)

(56) References Cited

U.S. PATENT DOCUMENTS

| 4,426,585 A | 1/1984 | Bigalke |
| 4,499,965 A | 2/1985 | Oetting et al. |

(Continued)

FOREIGN PATENT DOCUMENTS

| CN | 101000972 B | 5/2011 |
| CN | 203685448 U | 7/2014 |

(Continued)

OTHER PUBLICATIONS

International Preliminary Report on Patentability (PCT/IB/373) issued in PCT Application No. PCT/US2018/027159 dated Oct. 15, 2019, including document C26 (Written Opinion PCT/ISA/237 previously filed on May 15, 2018) (11 pages).

(Continued)

*Primary Examiner* — Nadeem Odeh
(74) *Attorney, Agent, or Firm* — Crowell & Moring LLP

(57) ABSTRACT

A system and method are provided for hybrid electric internal combustion engine applications in which a motor-generator, a narrow switchable coupling and a torque transfer unit therebetween are arranged and positioned in the constrained environment at the front of an engine in applications such as commercial vehicles, off-road vehicles and stationary engine installations. The motor-generator is preferably positioned laterally offset from the switchable coupling, which is co-axially-arranged with the front end of the engine crankshaft. The switchable coupling is an integrated unit in which a crankshaft vibration damper, an engine accessory drive pulley and a disengageable clutch overlap such that the axial depth of the clutch-pulley-damper unit is nearly the same as a conventional belt drive pulley and engine damper. The front end motor-generator system includes an electrical energy store that receives electrical energy generated by the motor-generator when the coupling is engaged. When the coupling is disengaged, the motor- (Continued)

generator may drive the pulley portion of the clutch-pulley-damper to drive the engine accessories using energy returned from the energy store, independent of the engine crankshaft.

20 Claims, 13 Drawing Sheets

(51) Int. Cl.
    *F16H 57/02*     (2012.01)
    *F16H 37/02*     (2006.01)
    *H02K 7/116*     (2006.01)
    *B60K 6/26*     (2007.10)
    *B60K 6/30*     (2007.10)
    *B60K 6/442*     (2007.10)
    *H02K 7/18*     (2006.01)
    *F02B 67/06*     (2006.01)
    *B60K 6/24*     (2007.10)
    *B60K 6/387*     (2007.10)
    *F16H 1/20*     (2006.01)
    *F16H 55/36*     (2006.01)

(52) U.S. Cl.
    CPC .............. *B60K 6/387* (2013.01); *B60K 6/442* (2013.01); *F02B 67/06* (2013.01); *F16H 37/02* (2013.01); *F16H 57/02* (2013.01); *H02K 7/00* (2013.01); *H02K 7/116* (2013.01); *H02K 7/18* (2013.01); *H02K 7/1815* (2013.01); *F16H 1/20* (2013.01); *F16H 55/36* (2013.01); *Y02T 10/6234* (2013.01); *Y02T 10/641* (2013.01); *Y10S 903/906* (2013.01); *Y10S 903/96* (2013.01)

(58) Field of Classification Search
    CPC . B60K 6/24; B60K 6/442; B60K 6/30; B60K 6/26; F02B 67/06; F16H 37/02; F16H 57/02; F16H 55/36; F16H 1/20; Y02T 10/6234; Y02T 10/641; Y10S 903/906; Y10S 903/96
    USPC .......................................................... 701/22
    See application file for complete search history.

(56) References Cited

U.S. PATENT DOCUMENTS

| | | | |
|---|---|---|---|
| 4,736,112 A | 4/1988 | Yabunaka | |
| 4,869,353 A | 9/1989 | Ohtsuki et al. | |
| 5,035,296 A | 7/1991 | Sjostrand | |
| 5,285,111 A | 2/1994 | Sherman | |
| 5,611,416 A | 3/1997 | Berger et al. | |
| 5,856,709 A | 1/1999 | Ibaraki et al. | |
| 5,931,380 A | 8/1999 | Aoki et al. | |
| 6,018,199 A | 1/2000 | Shiroyama et al. | |
| 6,026,921 A | 2/2000 | Aoyama et al. | |
| 6,082,316 A | 7/2000 | Ban et al. | |
| 6,192,851 B1 | 2/2001 | Asahara et al. | |
| 6,254,507 B1 | 7/2001 | Downs | |
| 6,299,541 B1 | 10/2001 | Bertin et al. | |
| 6,306,057 B1 | 10/2001 | Morisawa et al. | |
| 6,311,495 B1 | 11/2001 | Shimizu et al. | |
| 6,332,257 B1 | 12/2001 | Reed, Jr. et al. | |
| 6,367,570 B1 | 4/2002 | Long, III et al. | |
| 6,396,165 B1 | 5/2002 | Nagano et al. | |
| 6,555,927 B1 | 4/2003 | Suzuki et al. | |
| 6,668,953 B1 | 12/2003 | Reik et al. | |
| 6,781,252 B2 | 8/2004 | Berels | |
| 6,935,450 B1 | 8/2005 | Tsuzuki et al. | |
| 7,114,585 B2 | 10/2006 | Man et al. | |
| 7,137,362 B1 | 11/2006 | Settineri | |
| 7,419,021 B2 | 9/2008 | Morrow et al. | |
| 7,462,970 B2 | 12/2008 | Hoff et al. | |
| 7,558,666 B2 | 7/2009 | Digonis | |
| 7,641,584 B1 | 1/2010 | Belloso | |
| 7,681,676 B2 | 3/2010 | Kydd | |
| 7,690,454 B2 | 4/2010 | Rose | |
| 7,753,147 B2 | 7/2010 | Usoro | |
| 7,886,709 B2 | 2/2011 | Riedel et al. | |
| 7,954,580 B2 | 6/2011 | Usoro | |
| 8,011,461 B2 | 9/2011 | Rodriguez et al. | |
| 8,166,945 B2 | 5/2012 | Spicer et al. | |
| 8,272,463 B2 | 9/2012 | Kovach et al. | |
| 8,327,990 B2 | 12/2012 | Friedman | |
| 8,408,175 B2 | 4/2013 | Schoenek et al. | |
| 8,423,214 B2 | 4/2013 | Kshatriya | |
| 8,480,006 B2 | 7/2013 | Sanger et al. | |
| 8,500,590 B2 | 8/2013 | Showalter | |
| 8,512,007 B2 | 8/2013 | Hebrard | |
| 8,545,367 B2 | 10/2013 | Hartz et al. | |
| 8,561,588 B2 | 10/2013 | Reynolds et al. | |
| 8,596,391 B2 | 12/2013 | Kshatriya | |
| 8,606,450 B2 | 12/2013 | Holmes et al. | |
| 8,718,848 B2 | 5/2014 | Pfefferl et al. | |
| 8,753,762 B2 | 6/2014 | Major et al. | |
| 8,776,929 B2 | 7/2014 | West et al. | |
| 8,807,314 B2 | 8/2014 | Hebrard | |
| 8,808,124 B2 | 8/2014 | Major et al. | |
| 8,821,342 B2 | 9/2014 | Andreae et al. | |
| 8,833,324 B2 | 9/2014 | O'Brien et al. | |
| 8,840,523 B2 | 9/2014 | Tajima | |
| 8,876,656 B2 | 11/2014 | Erjawetz et al. | |
| 8,939,240 B2 | 1/2015 | Wehrwein et al. | |
| 9,051,911 B2 | 6/2015 | Staley | |
| 9,074,656 B2 | 7/2015 | Benz et al. | |
| 9,108,633 B1 | 8/2015 | Atluri et al. | |
| 9,108,635 B2 | 8/2015 | Miyazaki et al. | |
| 9,132,725 B2 | 9/2015 | Barnes | |
| 9,186,974 B2 | 11/2015 | Erjawetz et al. | |
| 9,358,968 B2 | 6/2016 | Nedorezov et al. | |
| 9,387,756 B1 | 7/2016 | Whiting et al. | |
| 9,421,964 B2 | 8/2016 | Ideshio et al. | |
| 9,447,873 B2 | 9/2016 | Pritchard | |
| 9,452,672 B2 | 9/2016 | Namuduri et al. | |
| 9,457,792 B2 | 10/2016 | Bradley et al. | |
| 9,587,559 B2 | 3/2017 | Hemphill et al. | |
| 9,669,698 B2 | 6/2017 | Crecelius et al. | |
| 9,873,317 B2 | 1/2018 | Ohnemus et al. | |
| 9,944,271 B2 | 4/2018 | Pandit et al. | |
| 10,017,039 B1 | 7/2018 | Colavincenzo | |
| 10,112,603 B2 | 10/2018 | Colavincenzo et al. | |
| 2002/0020875 A1 | 2/2002 | Arao et al. | |
| 2002/0107101 A1 | 8/2002 | Bowen et al. | |
| 2002/0108373 A1 | 8/2002 | Frey | |
| 2003/0062770 A1 | 4/2003 | Sasaki et al. | |
| 2003/0116368 A1 | 6/2003 | Winkelman et al. | |
| 2003/0173124 A1 | 9/2003 | Okada et al. | |
| 2005/0016304 A1 | 1/2005 | Ishii et al. | |
| 2006/0068970 A1 | 3/2006 | Rose | |
| 2006/0030450 A1 | 9/2006 | Kyle | |
| 2006/0283683 A1 | 12/2006 | Miller | |
| 2007/0080037 A1 | 4/2007 | Larry et al. | |
| 2007/0103002 A1 | 5/2007 | Chiao et al. | |
| 2007/0169970 A1 | 7/2007 | Kydd | |
| 2007/0209849 A1 | 9/2007 | Usoro | |
| 2007/0213151 A1 | 9/2007 | Usoro | |
| 2008/0020875 A1 | 1/2008 | Serrels et al. | |
| 2008/0051242 A1 | 2/2008 | Usoro | |
| 2008/0060375 A1 | 3/2008 | Sanger et al. | |
| 2008/0110683 A1 | 5/2008 | Serkh | |
| 2008/0179119 A1 | 7/2008 | Grenn et al. | |
| 2008/0217083 A1 | 9/2008 | Serkh et al. | |
| 2008/0228351 A1 | 9/2008 | McGee | |
| 2008/0314059 A1 | 12/2008 | Harkness et al. | |
| 2009/0000836 A1 | 1/2009 | Kydd | |
| 2009/0048747 A1 | 2/2009 | Stridsberg | |
| 2009/0098976 A1 | 4/2009 | Usoro et al. | |
| 2009/0099256 A1 | 4/2009 | Takagaki et al. | |
| 2009/0101465 A1 | 4/2009 | Hart et al. | |
| 2009/0114463 A1 | 5/2009 | DeVault | |
| 2009/0139789 A1 | 6/2009 | Yang | |

(56) References Cited

U.S. PATENT DOCUMENTS

| | | |
|---|---|---|
| 2009/0166113 A1 | 7/2009 | Luo et al. |
| 2009/0255741 A1 | 10/2009 | Major et al. |
| 2009/0294191 A1 | 12/2009 | Sheidler et al. |
| 2009/0314559 A1 | 12/2009 | Palitto |
| 2010/0056327 A1 | 3/2010 | Hofbauer |
| 2010/0094513 A1 | 4/2010 | Mair |
| 2010/0117375 A1 | 5/2010 | Kwok |
| 2010/0158702 A1 | 6/2010 | Colavincenzo |
| 2010/0167869 A1 | 7/2010 | Falkenstein et al. |
| 2010/0193270 A1 | 8/2010 | Deshaies et al. |
| 2010/0269920 A1 | 10/2010 | Henning |
| 2011/0015812 A1 | 1/2011 | Vogel |
| 2011/0065543 A1 | 3/2011 | Usoro |
| 2011/0099993 A1 | 5/2011 | Ishii et al. |
| 2011/0259189 A1 | 10/2011 | Diekmeyer et al. |
| 2011/0319214 A1 | 12/2011 | Showalter |
| 2012/0136547 A1 | 5/2012 | Miyazaki et al. |
| 2012/0204555 A1 | 8/2012 | Didelot et al. |
| 2012/0225751 A1 | 9/2012 | Andreae et al. |
| 2012/0285292 A1 | 11/2012 | Barnes |
| 2012/0303196 A1 | 11/2012 | Kieser et al. |
| 2012/0316713 A1 | 12/2012 | Pfefferl et al. |
| 2013/0053199 A1 | 2/2013 | Thompson |
| 2013/0166118 A1 | 6/2013 | Kim |
| 2013/0204472 A1 | 8/2013 | Pfefferl |
| 2013/0204490 A1 | 8/2013 | Pfefferl et al. |
| 2013/0306423 A1 | 11/2013 | Ideshio et al. |
| 2014/0206494 A1 | 7/2014 | Geis-Esser et al. |
| 2014/0209281 A1 | 7/2014 | Kamps et al. |
| 2014/0249730 A1 | 9/2014 | Hilberer |
| 2014/0256506 A1 | 9/2014 | Ideshio et al. |
| 2014/0265331 A1 | 9/2014 | Creviston |
| 2015/0019079 A1 | 1/2015 | Romanato |
| 2015/0038288 A1 | 2/2015 | Holmes et al. |
| 2015/0039168 A1 | 2/2015 | Kamatani et al. |
| 2015/0060166 A1 | 3/2015 | Erjawetz et al. |
| 2015/0073675 A1 | 3/2015 | Malone et al. |
| 2015/0101789 A1 | 4/2015 | Enomoto et al. |
| 2015/0121922 A1 | 5/2015 | Chang et al. |
| 2015/0135742 A1 | 5/2015 | Rousseau et al. |
| 2015/0159751 A1 | 6/2015 | Pritchard |
| 2015/0260145 A1 | 9/2015 | Holmes |
| 2015/0283997 A1 | 10/2015 | Wang et al. |
| 2015/0285312 A1 | 10/2015 | Williams et al. |
| 2015/0285317 A1 | 10/2015 | Lannutti |
| 2015/0306954 A1 | 10/2015 | Matsuura et al. |
| 2015/0328982 A1 | 11/2015 | Takaira et al. |
| 2015/0328983 A1 | 11/2015 | Takaira et al. |
| 2016/0001649 A1 | 1/2016 | Benjey |
| 2016/0052383 A1 | 2/2016 | Caron |
| 2016/0082946 A1 | 3/2016 | Kodawara |
| 2016/0091070 A1 | 3/2016 | Park et al. |
| 2016/0097328 A1 | 4/2016 | Wintgens et al. |
| 2016/0101770 A1 | 4/2016 | Yamazaki et al. |
| 2016/0107505 A1 | 4/2016 | Johnston |
| 2016/0107523 A1 | 4/2016 | Maeda et al. |
| 2016/0167499 A1 | 6/2016 | Holmes et al. |
| 2016/0193991 A1 | 7/2016 | Apelsmeier |
| 2016/0244050 A1 | 8/2016 | Ouchi et al. |
| 2016/0248129 A1 | 8/2016 | Dunham et al. |
| 2016/0258409 A1 | 9/2016 | Marthaler et al. |
| 2016/0280212 A1 | 9/2016 | Lian et al. |
| 2016/0280213 A1 | 9/2016 | Lian et al. |
| 2016/0326914 A1 | 11/2016 | Bagayatkar |
| 2016/0347164 A1 | 12/2016 | Frank et al. |
| 2017/0089408 A1 | 3/2017 | Berthelemy |
| 2018/0119595 A1 | 5/2018 | Villegas Muriel et al. |
| 2018/0162213 A1 | 6/2018 | Colavincenzo et al. |
| 2018/0162355 A1 | 6/2018 | Colavincenzo et al. |
| 2018/0162369 A1 | 6/2018 | Colavincenzo et al. |
| 2018/0162370 A1 | 6/2018 | Colavincenzo et al. |
| 2018/0162371 A1 | 6/2018 | Colavincenzo et al. |
| 2018/0162372 A1 | 6/2018 | Colavincenzo et al. |
| 2018/0162373 A1 | 6/2018 | Colavincenzo et al. |
| 2018/0162374 A1 | 6/2018 | Colavincenzo et al. |
| 2018/0162375 A1 | 6/2018 | Colavincenzo et al. |
| 2018/0162376 A1 | 6/2018 | Colavincenzo et al. |
| 2018/0162377 A1 | 6/2018 | Colavincenzo |
| 2018/0162380 A1 | 6/2018 | Colavincenzo et al. |
| 2018/0162381 A1 | 6/2018 | Colavincenzo et al. |
| 2018/0162382 A1 | 6/2018 | Colavincenzo et al. |
| 2018/0166945 A1 | 6/2018 | Colavincenzo et al. |
| 2018/0290530 A1 | 10/2018 | Chai et al. |
| 2018/0306157 A1 | 10/2018 | Lee et al. |
| 2019/0001805 A1 | 1/2019 | Colavincenzo et al. |

FOREIGN PATENT DOCUMENTS

| | | |
|---|---|---|
| CN | 102723535 B | 7/2015 |
| CN | 105196859 A | 12/2015 |
| CN | 105604758 A | 5/2016 |
| CN | 105752082 A | 7/2016 |
| DE | 10 2005 024 359 A1 | 11/2006 |
| DE | 10 2012 013 334 A1 | 1/2014 |
| EP | 2 221 226 B1 | 1/2012 |
| FR | 2 995 014 B1 | 9/2014 |
| GB | 2523080 A | 8/2015 |
| JP | 2007-246030 A | 9/2007 |
| JP | 2012-111267 A | 6/2012 |
| JP | 5607954 B2 | 10/2014 |
| JP | 2016-098748 A | 5/2016 |
| WO | WO 2012/085294 A1 | 6/2012 |
| WO | WO 2015/019085 A2 | 2/2015 |

OTHER PUBLICATIONS

International Search Report (PCT/ISA/220 & PCT/ISA/210) issued in PCT Application No. PCT/US2017/060553 dated Jan. 18, 2018 (Three (3) pages).
Written Opinion (PCT/ISA/237) issued in PCT Application No. PCT/US2017/060553 dated Jan. 18, 2018 (Ten (10) pages).
International Search Report (PCT/ISA/220 & PCT/ISA/210) issued in PCT Application No. PCT/US2017/061041 dated Jan. 5, 2018 (Six (6) pages).
Written Opinion (PCT/ISA/237) issued in PCT Application No. PCT/US2017/061041 dated Jan. 5, 2018 (Three (3) pages).
International Search Report (PCT/ISA/220 & PCT/ISA/210) issued in PCT Application No. PCT/US2017/061672 dated Jan. 23, 2018 (Three (3) pages).
Written Opinion (PCT/ISA/237) issued in PCT Application No. PCT/US2017/061672 dated Jan. 23, 2018 (Four (4) pages).
International Search Report (PCT/ISA/220 & PCT/ISA/210) issued in PCT Application No. PCT/US2017/060975 dated Jan. 23, 2018 (Three (3) pages).
Written Opinion (PCT/ISA/237) issued in PCT Application No. PCT/US2017/060975 dated Jan. 23, 2018 (Four (4) pages).
R. Bao et al., "Using Pneumatic Hybrid Technology to Reduce Fuel Consumption and Eliminate Turbo-Lag", SAE International, Apr. 8, 2013 (twelve (12) pages).
International Preliminary Report on Patentability (PCT/IB/373) issued in PCT Application No. PCT/US2017/061672 dated Jun. 18, 2019, including document C7 (Written Opinion (PCT/ISA/237 previously filed on Feb. 5, 2018) (five (5) pages).
International Preliminary Report on Patentability (PCT/IB/373) issued in PCT Application No. PCT/US2017/060737 dated Jun. 18, 2019, including document C17 (Written Opinion (PCT/ISA/237 previously filed on Apr. 26, 2018) (six (6) pages).
International Search Report (PCT/ISA/210) issued in PCT Application No. PCT/US2017/062520 dated Jan. 19, 2018 (three (3) pages).
Written Opinion (PCT/ISA/237) issued in PCT Application No. PCT/US2017/062520 dated Jan. 19, 2018 (four (4) pages).
International Search Report (PCT/ISA/210) issued in PCT Application No. PCT/US2017/061265 dated Jan. 26, 2018 (three (3) pages).
Written Opinion (PCT/ISA/237) issued in PCT Application No. PCT/US2017/061265 dated Jan. 26, 2018 (seven (7) pages).

(56) References Cited

OTHER PUBLICATIONS

International Search Report (PCT/ISA/210) issued in PCT Application No. PCT/US2017/062018 dated Jan. 30, 2018 (three (3) pages).
Written Opinion (PCT/ISA/237) issued in PCT Application No. PCT/US2017/062018 dated Jan. 30, 2018 (six (6) pages).
International Search Report (PCT/ISA/210) issued in PCT Application No. PCT/US17/60737 dated Feb. 1, 2018 (four (4) pages).
Written Opinion (PCT/ISA/237) issued in PCT Application No. PCT/US17/60737 dated Feb. 1, 2018 (five (5) pages).
International Search Report issued in PCT Application No. PCT/US17/62457 dated Feb. 2, 2018 (four (4) pages).
Written Opinion (PCT/ISA/237) issued in PCT Application No. PCT/US17/62457 dated Feb. 2, 2018 (five (5) pages).
International Search Report (PCT/ISA/210) issued in PCT Application No. PCT/US17/65276 dated Feb. 23, 2018 (three (3) pages).
Written Opinion (PCT/ISA/237) issued in PCT Application No. PCT/US17/65276 dated Feb. 23, 2018 (four (4) pages).
Cummins Engines, Features and Parameters, http://cumminsengines.com/powerspec-isx-fan-control-features-and-parameters, 2015, (2 pages).
Horton, Lesson 3: Fan Drive Control System, (3 pages).
Logan Front Mount PTO's for Caterpillar C6.6 and C4.4 Diesel Engines and Generator Sets, Logan Clutch Corporation, 2011 (2 pages).
International Search Report (PCT/ISA/220 and PCT/ISA/210) issued in PCT Application No. PCT/US18/27159 dated Aug. 24, 2018 (six (6) pages).
Written Opinion (PCT/ISA/237) issued in PCT Application No. PCT/US18/27159 dated Aug. 24, 2018 (ten (10) pages).
International Preliminary Report on Patentability (PCT/IB/326 and PCT/IB/373) issued in PCT Application No. PCT/US2017/062457 dated Aug. 1, 2019, including document C19 (Written Opinion (PCT/ISA/237 previously filed on Apr. 26, 2018) (seven (7) pages).
International Search Report (PCT/ISA/210) issued in PCT Application No. PCT/US2019/045293 dated Sep. 17, 2019 (two (2) pages).
Written Opinion (PCT/ISA/237) issued in PCT Application No. PCT/US2019/045293 dated Sep. 17, 2019 (three (3) pages).

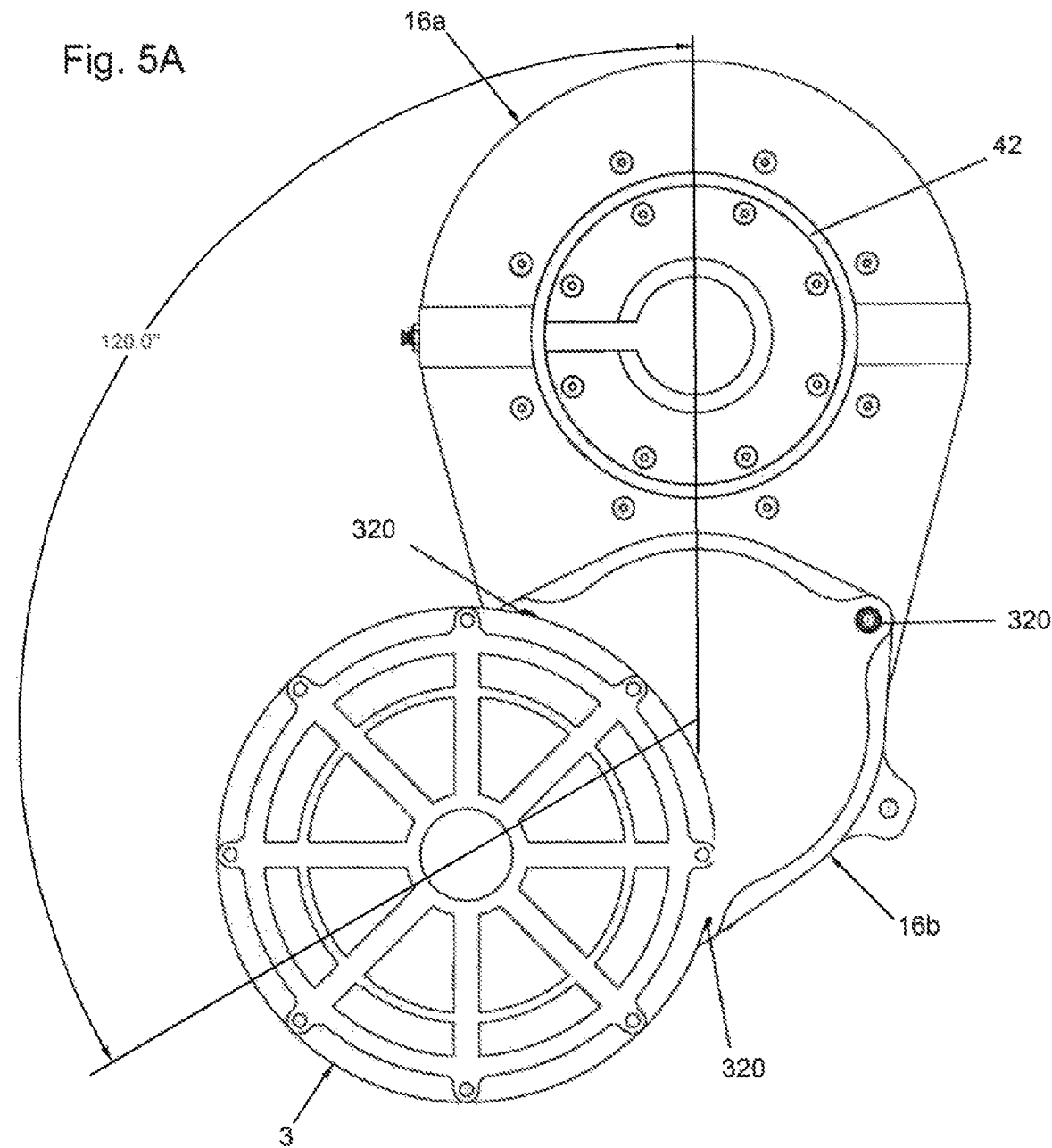

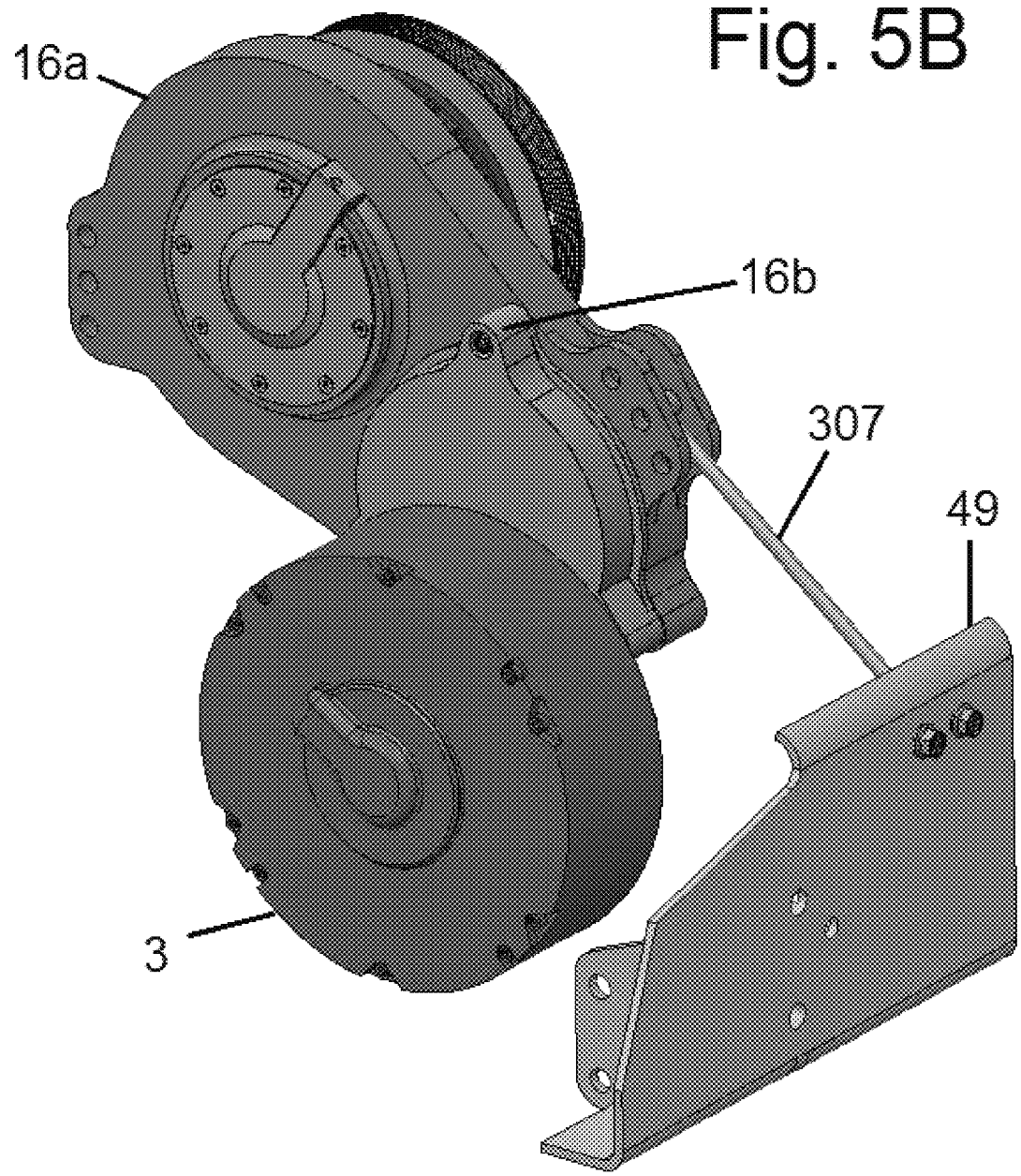

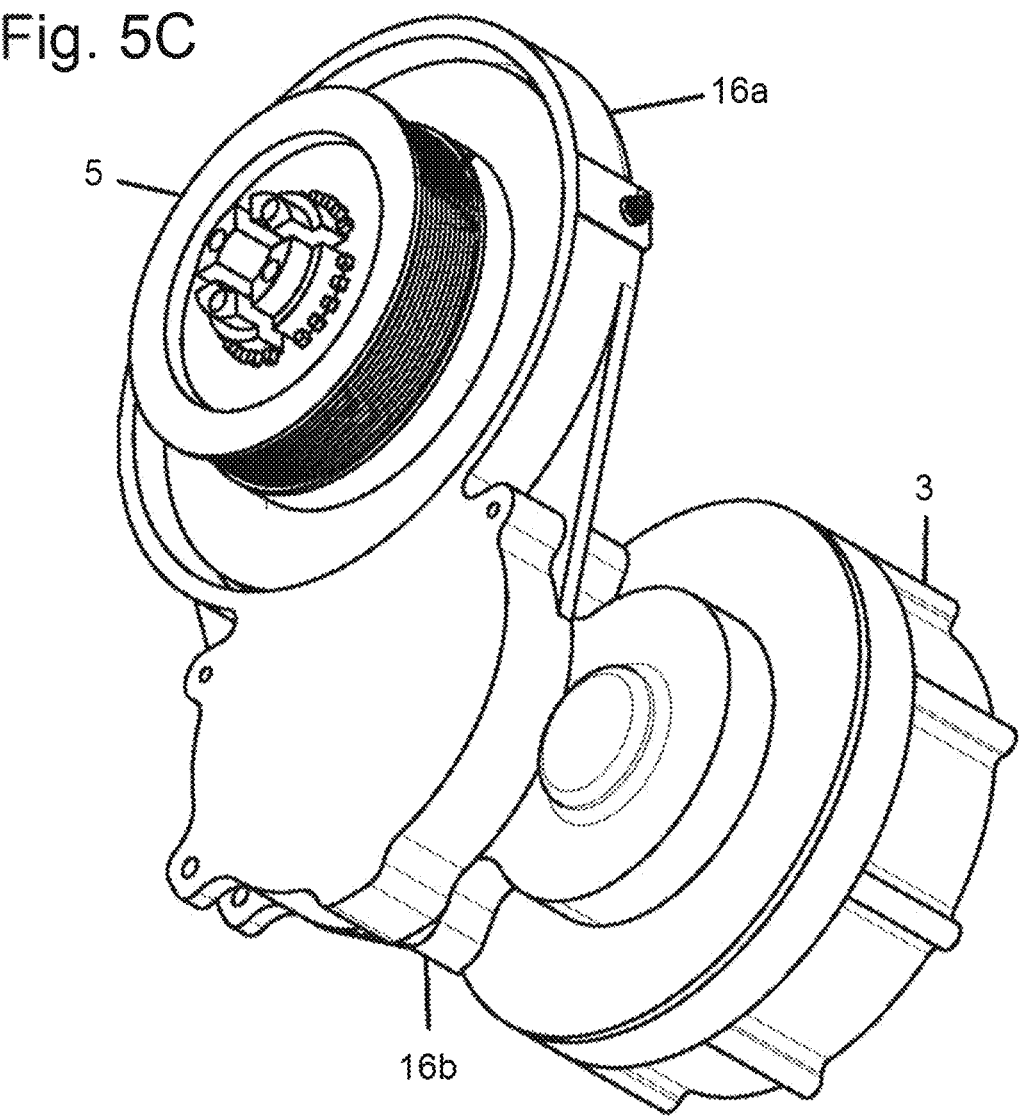

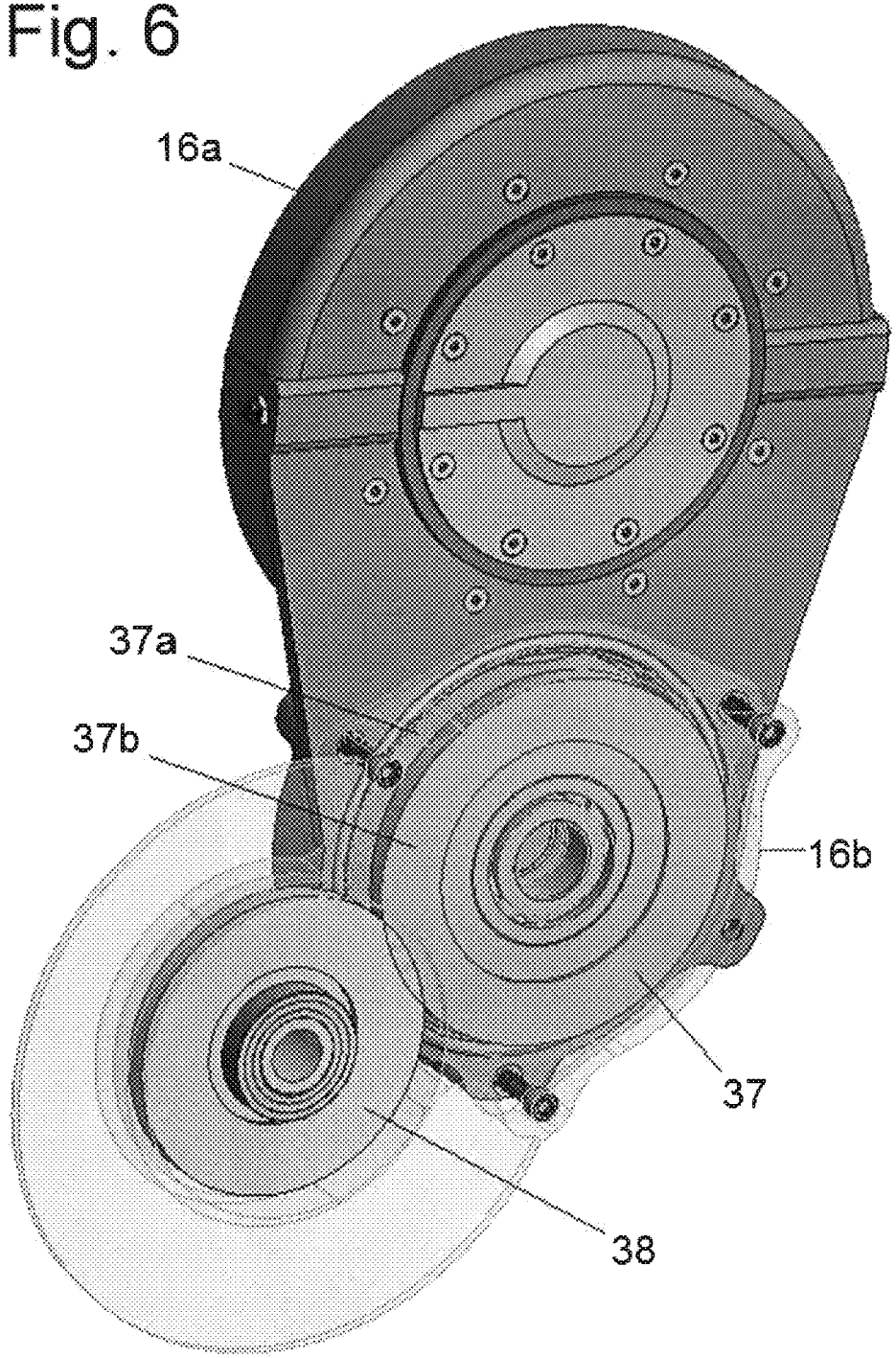

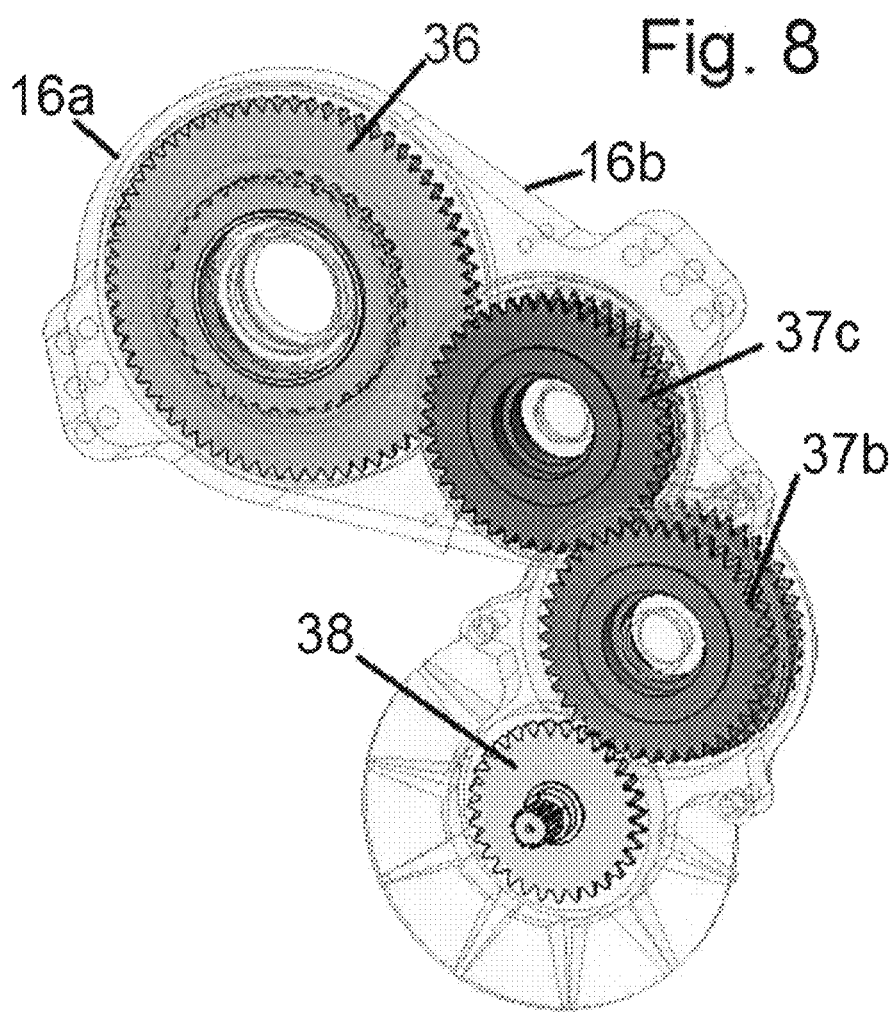

FRONT END MOTOR-GENERATOR SYSTEM AND MODULAR GENERATOR DRIVE APPARATUS

This is a continuation-in-part application, claiming priority to U.S. patent application Ser. Nos. 15/378,118, 15/378,130, 15/378,139, 15/378,246, 15/378,251, 15/378,764, 15/378,811, 15/378,853, 15/378,944 and 15/378,974, filed Dec. 14, 2016, the disclosures of which are incorporated herein by reference.

BACKGROUND OF THE INVENTION

The present invention relates to a system for selective coupling of a hybrid electric generating and storage system with an internal combustion engine. The present invention further relates to a method of operating the system.

BACKGROUND OF THE INVENTION

Hybrid electric vehicles having an internal combustion engine combined with a motor-generator and an electrical energy storage system have been the focus of considerable attention in the automotive field, particularly in the field of passenger vehicles. Development of hybrid electric vehicle systems has only recently begun to attract significant interest in commercial and off-road vehicles, e.g., trucks and busses in Vehicle Classes 2-8, in earth-moving equipment and railroad applications, and in stationary internal combustion engine-powered installations.

Hybrid electric technologies offer numerous advantages, including improvements in fuel efficiency, reduction in internal combustion engine emissions and vehicle noise to help meet government regulatory requirements, improved vehicle performance and lower fleet operating costs. These advantages are obtained in significant part by hybrid electric systems' ability to recapture energy which would otherwise be wasted (such as mechanical energy from braking that would otherwise be dissipated as thermal energy to the environment) and return of the captured energy at another time when needed, such as powering vehicle components in lieu of using the internal combustion engine as the source of power or assisting in vehicle propulsion.

Typically, hybrid electric vehicle motor-generators have been arranged either independently of the internal combustions engine (for example, using separate electric motors to power and recover energy from front wheels while the engine provides propulsion power to the rear wheels), or have been coupled to the engine, for example being integrated into the "rear" of the engine (i.e., the end at which the engine's flywheel is located) or between the engine and the driveline to the wheels. This "behind the engine" position permits the motor-generator equipment to deliver torque directly to the vehicle's driveline and wheels, and to be directly driven by the driveline, for example, during regenerative braking events. Examples of the latter include flywheel-type motor-generators in which a conventional engine's flywheel is modified to serve as a motor-generator rotor and a concentrically-mounted stator is located around the flywheel, and separate electric motors arranged between the engine and the drive wheels, such as the so-called "two mode hybrid" transmission offered by General Motors in the 2009 GMC Silverado light-duty pickup in which the transmission accommodated two electric motors for vehicle propulsion and electric energy generation.

Another form of adding a motor-generator to an internal combustion engine is the use of so-called starter-generators. This approach directly couples an electric motor to an engine to serve both as an electric generator (a function traditionally performed by a conventional belt-driven alternator) and as an engine starter, thereby reducing the weight and cost of duplicate alternator and starter electric motors. Such starter-generator installations are particularly useful in so-called engine stop-start systems which turn off the engine during periods when the vehicle is stopped to save fuel and reduce idling emissions. Starter-generators have been located behind the engine (for example, an appropriately engineered flywheel motor-generator may also be used as a starter), as well as being mounted at the front end of an engine where the starter-generator can drive a belt directly coupled to the engine crankshaft. An example of the latter system the "belt alternator starter" system that was offered by General Motors as an option in the 2007 Saturn Vue sport-utility vehicle. These systems are very difficult to adapt to large engines, such as commercial vehicle diesel engines, because the electric motor must be larger to deal with the much higher torque demands of these heavy-duty engines, such as starting and operating various components (for example, an engine cooling fan can demand upwards of 50 KW of power, a load that requires a large amount of torque to drive the fan belt). Further, the belt drive in such an enlarged system would need to have the capacity to transfer the large levels of torque, something that may not be possible, or at least practical, because thicker and broader drive belts and pulleys sufficient to handle the torque demands may be so much larger and heavier than their automotive counterparts that they are weight, size and/or cost prohibitive.

Another approach to electrification is to use multiple individual electric motors to individually drive energy-consuming engine and vehicle accessories such as air conditioner compressors, power steering pumps, air compressors, engine cooling fans and coolant pumps, in order to reduce fuel consumption by removing the accessory loads from the engine. This approach significantly increase vehicle weight, cost, and wiring harness and control system line lengths and complexity, potentially offsetting fuel economy or emissions reduction gains provided by removing engine accessory loads from the engine.

The prior art hybrid electric vehicle systems have a number of disadvantages that have hindered their adoption in applications such as commercial vehicles. These include: engineering difficulties associated with attempting to scale up hybrid electric drive train components to handle the very high torque output of large engines (typically high-torque output diesel engines); the interdependence of the engine and motor-generator operation as a result of these components being either integral to the rear of the engine or directly in the drive line (i.e., both the engine and the motor-generator must rotate together, even when rotation of one or the other is not needed or even detrimental to overall vehicle operating efficiency); and the inability to independently meet "hotel" loads (e.g., overnight climate control and 120 volt power demands in a commercial vehicle tractor sleeper compartment) without either operating the vehicle's engine or operation of a separate vehicle-mounted auxiliary power unit ("APU"), such as a dedicated self-contained internal combustion engine package or a dedicated battery package containing multiple-conventional batteries and associated support equipment. These auxiliary power units are very costly (typically several thousand dollars), heavy and demand a considerable amount of space on an already space-constrained vehicle. They also have further disadvantages of, in the case of a fuel combusting APU, the potential hazards associated with open flames and generating carbon monoxide that could enter the sleeper compartment during driver rest periods, and in the case of a full electric APU, may not being able to return sufficient energy to supply all of the vehicle's accessory demands for extended periods with the vehicle engine shut down.

SUMMARY OF THE INVENTION

The present invention is related to front end motor generator systems and methods set forth in the above-identified related U.S. patent applications. These disclosures describe, among other things, a hybrid electric vehicle system located at a front end of an engine, with a motor-generator being arranged in a manner that requires little or no extension of the length of the front of the vehicle, as discussed further, below.

As used in this description, the "front end" of the engine is the end opposite the end from which engine-generated torque output is transferred to the primary torque consumers, such as a vehicle's transmission and drive axles or a stationary engine installation's load, such as a pump drive. Typically, the rear end of an engine is where the engine's flywheel is located, and the front end is where components such as engine-driven accessories are located (e.g., air conditioning and compressed air compressors, engine cooling fans, coolant pumps, power steering pumps). While the discussions that follow focus primarily on commercial vehicle embodiments in which the engine crankshaft is aligned with the longitudinal axis of the vehicle, the present invention is not limited to front-engine, longitudinally-aligned engine applications, but also may be used with transverse-mounted engines (including transverse-mounted engines located at the front or rear of a vehicle) which may also have highly space-constrained environments in the region adjacent to the end of the engine opposite the flywheel end. Further, while the present disclosure is primarily directed to use of the FEMG system in vehicle applications (in particular, to commercial vehicle applications), the FEMG system is also well-suited for use with stationary engine installations (for example, standby diesel generators), off-road engine applications such as self-propelled construction equipment, and other engine applications in which the available space for providing hybrid electric capability at the front of the engine is limited.

Preferably, the front end motor-generator system has the motor-generator located in the front region of the engine, laterally offset to the side of the rotation axis of the engine crankshaft, supported on a torque transfer segment (also referred to as a "drive unit"), for example a narrow-depth single reduction parallel shaft gearbox arranged with its input rotation axis co-axial with the engine crankshaft. The motor-generator preferably is positioned either behind the torque transfer segment in a space between the engine and an adjacent longitudinal vehicle chassis frame member, or in front of the torque transfer segment, for example in a space below the vehicle's coolant radiator. The present invention is not limited to these locations for the motor-generator, but it instead may be located anywhere in the region near the front of the engine as long as the torque transfer segment on which it is mounted can align with the engine crankshaft rotation axis.

Preferably the torque transfer segment also provides a suitable speed ratio between its input and outputs (e.g., a 2:1 ratio) to better adapt engine and motor-generator speeds to one another, i.e., providing a speed increase from the engine to the motor-generator and speed reduction from the motor-generator output. The torque transfer segment may be a gearbox with gears or another drive arrangement, such as a chain belt, on a motor-generator side of a disengageable coupling (discussed further, below) between the engine crankshaft and the torque transfer segment that transfers torque between the motor-generator end and the engine end of the torque transfer segment. The torque transfer segment has an axially-narrow profile to permit it to be accommodated between the front of the engine crankshaft and any components in front of the engine, such as the engine's coolant radiator.

An important feature of the front end motor-generator system is that the motor-generator exchanges torque with the engine crankshaft via a switchable coupling (i.e., disengageable) between the torque transfer segment and the front end of the crankshaft. The switchable coupling includes an engine-side portion coupled directly to the engine crankshaft, a drive portion engageable with the engine-side portion to transfer torque therebetween, and an engagement device, preferably an axially-actuated clutch between the drive portion and the engine-side portion. The engine-side portion of the coupling includes a crankshaft vibration damper (hereafter, a "damper"), unlike a conventional crankshaft damper that traditionally has been a separate element fixed to the crankshaft as a dedicated crankshaft vibration suppression device. This arrangement enables transfer of torque between the accessory drive, the motor-generator and the engine in a flexible manner, for example, having the accessory drive being driven by different torque sources (e.g., the engine and/or the motor-generator), having the engine the being the source of torque to drive the motor-generator as an electric generator, and/or having the motor-generator coupled to the engine and operated as a motor to act as a supplemental vehicle propulsion torque source.

Particularly preferably, the switchable coupling is an integrated clutch-pulley-damper unit having the clutch between the engine side damper portion and the drive portion. The drive side portion includes a drive flange configured to be coupled to the engine-end of the torque transfer segment, the drive flange also including one or more drive pulley sections on its outer circumference. This preferred configuration also has all three of the pulley, clutch and damper arranged concentrically, with at least two of these elements partially overlapping one another along their rotation axis. This arrangement results in a disengageable coupling with a greatly minimized axial depth to facilitate FEMG mounting in the space-constrained environment in front of an engine. The axial depth of the coupling may be further minimized by reducing the axial depth of the clutch, pulley and damper to a point at which the drive pulley extends concentrically around all or at least substantially all of the clutch and the engine-side damper portion of the coupling.

Alternatively, one or more of the three clutch, pulley and damper portions may be arranged co-axially with, but not axially overlapping the other portions as needed to suit the particular front end arrangements of engines from different engine suppliers. For example, in an engine application in which a belt drive is not aligned with the damper (i.e., the damper does not have belt-driving grooves about its outer circumference, such as in some Cummins® engine arrangements), belt-driving surface of the pulley portion of the coupling need not axially overlap the damper. In other applications having belt drive surfaces on the outer circumference of the damper and a further belt drive surface on a pulley mounted in front of the damper such as in some Detroit Diesel® engines, the coupling that would be used in place of the original damper and pulley may be arranged with both belt drive surfaces on a pulley that extends axially over the damper (i.e., the damper axially overlaps substantially all of both the damper and the clutch), or the belt drive surface on the outer circumference of the damper may be maintained (for example, to drive engine accessories that are never disconnected from the crankshaft, such as an engine coolant pump) while the other belt drive surface is located on the pulley member that extends axially over the clutch.

While in the description below reference is made to connecting the damper portion of the switchable coupling to the engine crankshaft, the switchable coupling engine connection is not limited to being connected to the crankshaft, but may be connected to any rotatable shaft of the engine accessible from the front of the engine that is capable of transferring torque between the engine and the motor-generator, such as a crankshaft-driven jackshaft or a suitably engineered camshaft having a front-accessible shaft end. Further, while in the description below reference is made to connecting a portion of the switchable coupling having the damper to the engine crankshaft, the switchable coupling's engine-side connection is not limited to a portion having a damper, but includes portions without a damper (such as a plate member) capable of being connected to a rotatable engine shaft while supporting an engine-side part of the disengageable coupling (such as holding an engine-side clutch plate of the switchable coupling opposite a pulley-side clutch plate).

The FEMG motor-generator is preferably electrically coupled to an electrical energy storage unit (also referred to herein as an "energy store"). This energy store preferably includes both batteries suitable for high-capacity, long-term energy storage, such as Lithium chemistry-based batteries capable of storing and returning large amounts of energy at moderate charge/discharge rates, and super capacitors capable of receiving and releasing electrical energy at very high charge/discharge rates that may be beyond the ability of the Lithium batteries to safely handle. This combination provides an energy store which can work with the motor-generator to absorb and/or discharge electrical current for short periods at higher-than normal levels (i.e., over a wider range of motor-generator input or output loads than could be handled by battery cells), while also providing battery-based long-term energy storage and return at lower charge and discharge rates.

The drive side of the switchable coupling may be used to drive engine accessories, selectively driving the accessories using torque delivered from the engine when the coupling is engaged, from the motor-generator when the coupling is disengaged, or both when the coupling is engaged. Engine accessories traditionally have been belt-driven, being directly driven by the engine crankshaft via a drive belt pulley bolted to the crankshaft. In the FEMG system, the engine accessories also are driven by a pulley, but the pulley is located on the motor-generator side of the clutch-pulley-damper (the "drive portion" identified above). When the pulley-clutch-damper is disengaged, all of the engine accessories driven by the pulley are disconnected from the engine, removing their respective power demands from the engine. This isolation of the accessories from the engine reduces fuel consumption when the engine is running. In addition, because the accessories may be independently driven by the FEMG motor-generator via the torque transfer segment while the coupling is disengaged, the engine may be shut off or operated at idle with few or no parasitic loads while the vehicle is at a standstill to save fuel and reduce emissions.

Further system efficiency gains may be obtained when the clutch-pulley-damper is disengaged, as the motor-generator's operating speed may be varied as desired to operate one or more of the engine accessories at a speed providing increased operating efficiency, while other engine accessories are operated at sub-optimum efficiency speeds if doing so decreases overall energy consumption.

Preferably an FEMG controller, discussed further below, executes an algorithm which evaluates factors such as engine accessory operating efficiency data and current vehicle operating state information (e.g., energy store state of charge ("SOC"), engine torque output demand, coolant temperature) to select a combination of vehicle operating parameters (e.g., individual engine accessory clutch engagements, accessory operating speeds, clutch-pulley-damper pulley speed and engagement state, motor-generator speed and torque output) to determine a compromise configuration of coupling and clutch engagement states and component operating speeds that meets vehicle's operational needs while reducing fuel and energy use. For example, while providing superior overall system efficiency might be achieved by operating the motor-generator at a speed and torque output that places as many engine accessories as possible at or near their peak operating efficiency states, a particular vehicle need (such as the need to operate the high-torque demand engine cooling fan to control engine coolant temperature) may result in the FEMG controlling the motor-generator speed and/or torque output to ensure that the particular demand is met, and then operating the other individual engine accessories driven by the clutch-pulley-damper in as efficient a manner as is possible under the present vehicle operating circumstances.

Similarly, if the current demand for vehicle propulsion torque from the engine is high (and the charge state of the energy store allows), the FEMG controller may control the clutch-pulley-damper to be switched to an engaged state and command the motor-generator to supply supplemental torque to the engine crankshaft to increase the total output of propulsion torque, even if this results in the engine accessories being driven at less than optimum efficiency because their speeds are tied to the crankshaft speed.

Additional details regarding the operational possibilities and benefits of selectively-drivable engine accessories and storage and retrieval of electrical energy to support efficient vehicle operation are described in the incorporated-by-reference related applications identified above.

The present disclosure is directed to an alternative approach to coupling a front end motor-generator system's motor-generator to the switchable coupling and the accessory drive, in a manner that still does not require any significant lengthening of the front end of a vehicle.

In particularly space-constrained applications, there may not be sufficient space available to permit a torque transfer segment to be aligned with a switchable coupling connected to a torque source such as an engine crankshaft, while at the same time supporting and handling torque transfer to and from a motor-generator having the gearbox-end of its rotor shaft aligned in same plane as the switchable coupling's connection to the gearbox. In addition, the demands of the wide variety of equipment arrangements in different applications (for example, just within the vehicle field, between several different vehicle manufacturers' engine compartment arrangements) cannot be met by FEMG equipment that can support only limited orientations.

The present invention addresses this and other problems with a torque transfer segment having a gearbox and gearbox housing that permit the switchable coupling and the motor-generator to be substantially axially offset, and preferably configured to be flexibly "clocked" (i.e., positioned at different angular positions relative to one another) as needed for a particular installation. More preferably, the components of the gearbox are configured to permit modular assembly of the gearbox housing, the switchable coupling and the motor-generator, for example, with predetermined angular mounting positions, such as with fasteners positioned at 90° or 120° intervals around their respective rotation axes. The present invention can maintain the relatively narrow axial depth of the torque transfer segment in the region of the switchable coupling (the region most likely to be highly space-constrained behind a vehicle's radiator and other front end components), while allowing the motor-generator to be positioned circumferentially and/or axially offset as necessary to clear nearby interferences. This additional flexibility permits a FEMG system to be installed in applications where there may not be available co-planar space for the motor-generator, switchable coupling and motor-generator, but there exists sufficient nearby space that may be "reached" buy clocking and/or axial displacement of the gearbox gears between the switchable coupling and the motor-generator.

The flexible torque transfer segment of the present invention is capable of providing arrangements with different FEMG component "footprints," for example, allowing a gear in the gearbox driving the motor-generator to be axially displaced from a gear connected to the switchable coupling, and allowing the motor-generator end of the gearbox housing to be rotated to a position above or below an interference (such as an vehicle frame cross-member), without the expense and production lead times that would otherwise accompany a need to produce an application-specific torque transfer segment for every new application.

In a preferred embodiment, the FEMG gearbox housing may be formed as a two-piece design in which an upper half of the gearbox and the switchable coupling remain close to the torque source (in an application using an internal combustion engine, adjacent to the front end of the engine crankshaft), and the lower half of the gearbox housing is axially displaced and rotated laterally to one side of the upper half of the housing.

An example of such an arrangement may include a drive gear in the upper half of the housing co-axially connected to the switchable coupling, a gear in a plane axially away from the plane of the drive gear that is co-axially connected to the motor-generator's rotor shaft in the lower half of the housing, and a pinion and idler gear between the drive gear and the motor-generator gear which extends axially between the axially-separate gear planes. This example may also include predetermined fastener connection locations on the upper and lower halves of the gearbox housing which permit the halves to be coupled in more than one orientation relative to one another (and thus also the motor-generator relative to the switchable coupling) and relative to the gearbox' stationary mounting location. For example, in order to avoid interferences in an particular installation, the limited space available may require that the upper gearbox housing be oriented at its mounting location at 4 o'clock (relative to vertical), and the lower half of the gearbox housing (with the motor-generator) to be mounted axially ahead of the switchable coupling, at a 6 o'clock orientation (relative to vertical). With pre-arranged 120° fastener mounting locations on the upper half of the housing, the upper half of the housing may be rotated to position its lower-half interface to the desired 4 o'clock orientation, while pre-arranged 60° fastener mounting locations on the upper and lower halves of the housing would permit the lower housing half (and thus also the motor-generator) to be clocked downward to the 6 o'clock orientation. At the same time, the axial displacement provided by the elongate pinion and idler gear arrangement between the switchable coupling-end gear and the motor-generator-end gear would allow the motor-generator to be positioned axially ahead of an interference, such as a frame cross-member or component mount.

In another embodiment of the present invention, the half of the gearbox housing supporting the motor-generator may be produced in with a predetermined number of different axial lengths (i.e., different pinion and idler gear lengths). This would provide additional flexibility in a modular FEMG torque transfer segment design, while minimizing costs by avoiding the need for custom gearbox housings for every new application. Alternatively, the axial portion of the gearbox housing containing the pinion and idler gear may be formed with the switchable coupling half of the housing. In either arrangement, when the housing portions are assembled, at least one end of the pinion and idler gear arrangement is received in the opposite housing portion in a manner that engages the opposite gear (i.e., where the pinion and idler gear are combined with the motor-generator portion of the gearbox housing, the idler gear engages the switchable-coupling's drive gear when the housing portions are mated together).

Other objects, advantages and novel features of the present invention will become apparent from the following detailed description of the invention when considered in conjunction with the accompanying drawings.

BRIEF DESCRIPTION OF THE DRAWINGS

FIGS. 5A-5C are elevation and oblique views of another embodiment of an FEMG gearbox with axial and circumferential offsets.

FIG. 6 is a partial phantom view of the offset FEMG gearbox of FIGS. 5A-5C showing the relative positioning of idler and pinion gears in the gearbox housing.

FIG. 8 is a schematic view of another embodiment of an offset FEMG gearbox.

DETAILED DESCRIPTION OF THE DRAWINGS

A Front End Motor-Generator System Embodiment.

Figure 1A:
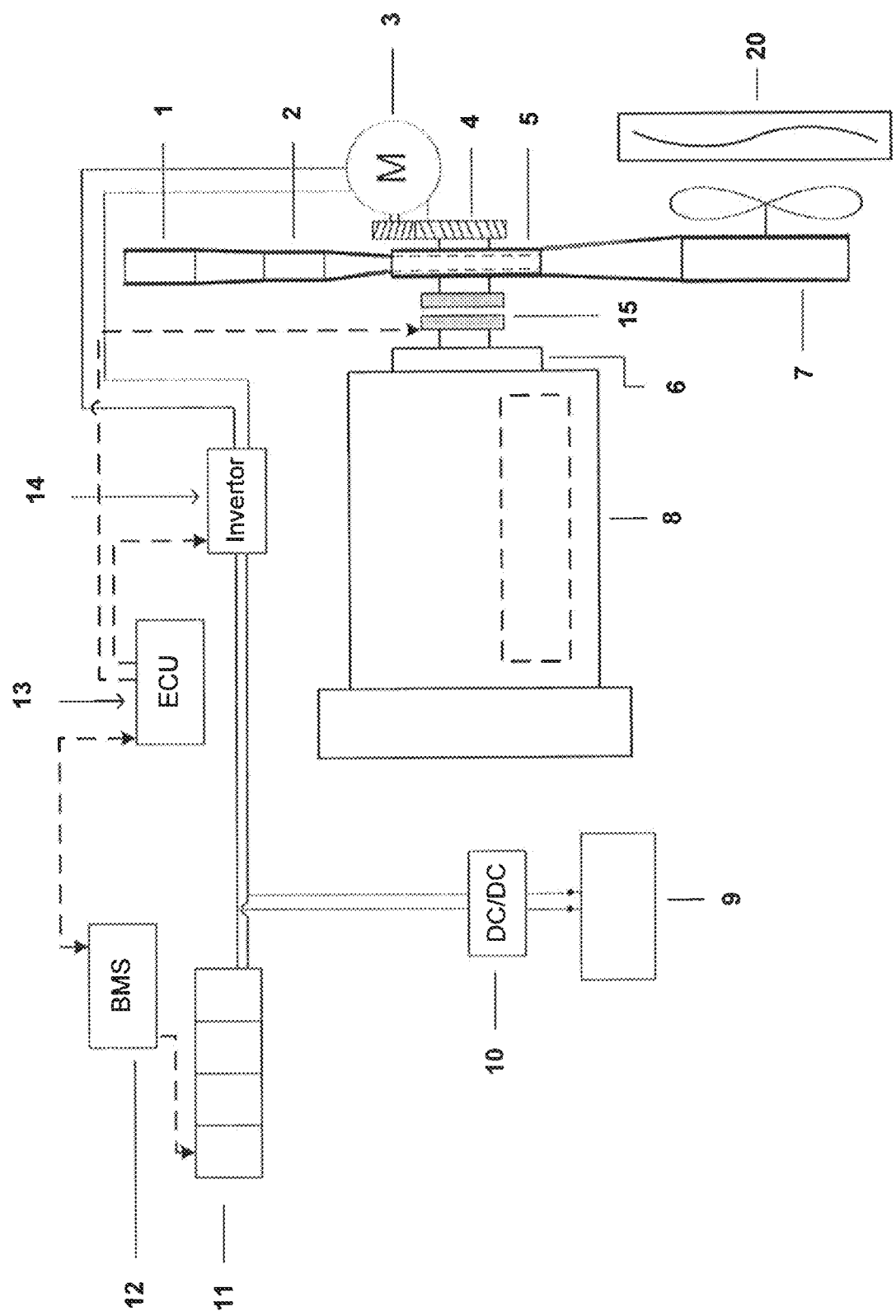
FIGS. 1A and 1B are schematic illustrations of an overall view of the arrangements of an FEMG system.
Figure 1B:
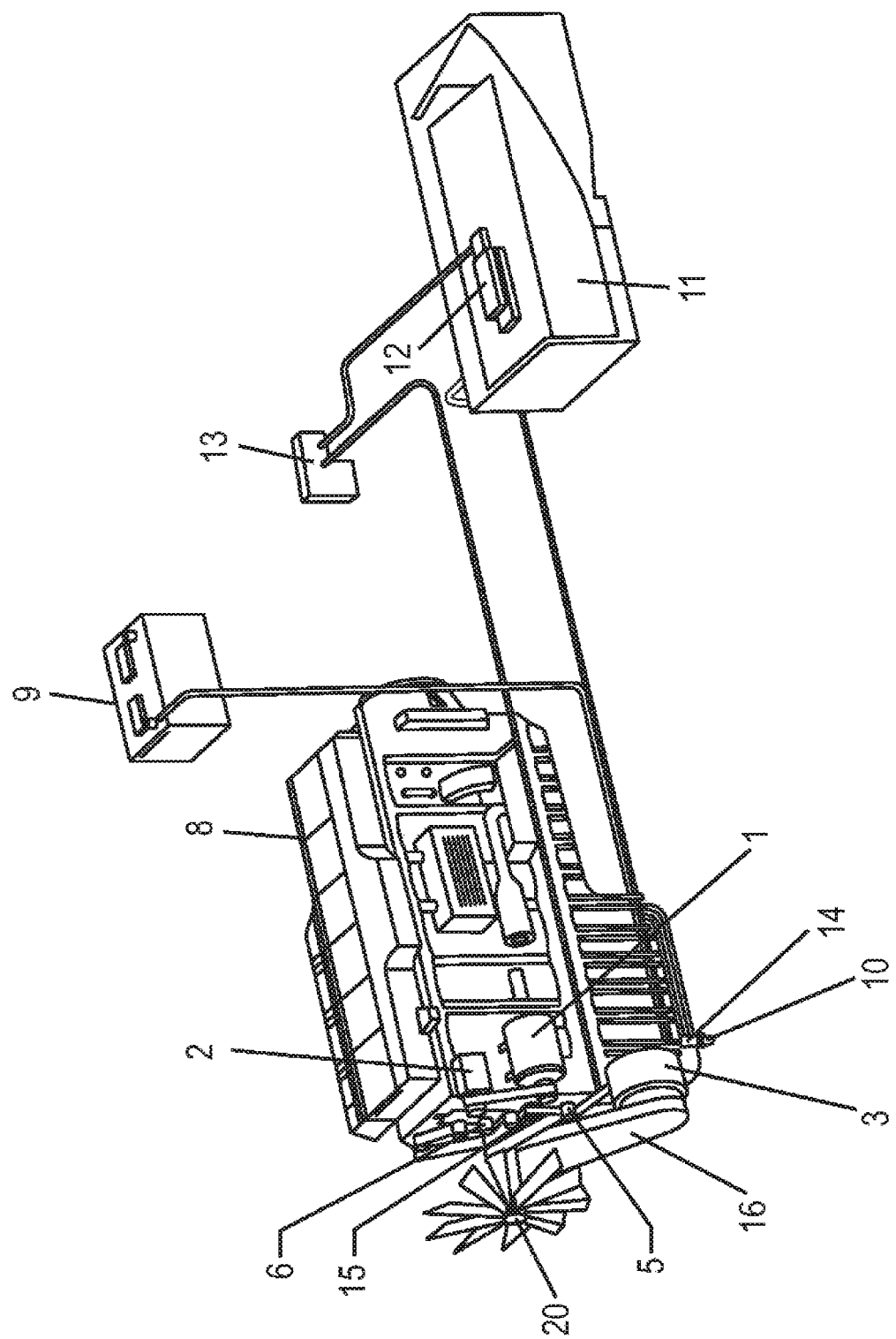

FIG. 1A is a schematic illustration showing components of an embodiment of an FEMG system. FIG. 1B is a schematic illustration of several of the FEMG system components in the chassis of a commercial vehicle. In this arrangement, the engine accessories (including air compressor 1, air conditioning compressor 2 and engine cooling fan 7 arranged to pull cooling air through engine coolant radiator 20) are belt-driven from a pulley 5. The pulley 5 is located co-axially with a damper 6 coupled directly to the crankshaft of the internal combustion engine 8. The accessories may be directly driven by the drive belt or provided with their own on/off or variable-speed clutches (not illustrated) which permit partial or total disengagement of an individually clutch-equipped accessory from the belt drive.

In addition to driving the accessory drive belt, the pulley 5 is coupled a drive unit having reduction gears 4 to transfer torque between a crankshaft end of the drive unit and an opposite end which is coupled to a motor-generator 3 (the drive unit housing is not illustrated in this figure for clarity). A disengageable coupling in the form of a clutch 15 is arranged between the crankshaft damper 6 and the pulley 5 (and hence the drive unit and the motor-generator 3). Although schematically illustrated as axially-separate components for clarity in FIG. 1A, in this embodiment the crankshaft 6, clutch 15 and pulley 5 axially overlap one another at least partially, thereby minimizing an axial depth of the combined pulley-clutch-damper unit in front of the engine. Actuation of the pulley-clutch-damper clutch 15 between its engaged and disengaged states is controlled by an electronic control unit (ECU) 13.

In the FIGS. 1A-1B embodiment, the damper 6 receives torque input from internal combustion engine 8. However, the torque source coupled to the input of the switchable coupling is not limited to an internal combustion engine, and may include any suitable a torque source that is capable of driving the FEMG gearbox when the switchable coupling is engaged, such as a propulsion electric motor of an electric vehicle. Moreover, the FEMG components may also be used in a stand-alone application in which the moto-generator is capable of delivering torque through an FEMG gearbox to an accessory drive, without a separate torque source being coupled to the input side of the gearbox.

On the electrical side of the motor-generator 3, the motor-generator is electrically connected to a power invertor 14 which converts alternating current (AC) generated by the motor-generator output to direct current (DC) useable in an energy storage and distribution system. The power invertor 14 likewise in the reverse direction converts direct current from the energy storage and distribution system to alternating current input to power the motor-generator 3 as a torque-producing electric motor. The inverter 14 is electrically connected to an energy storage unit 11 (hereafter, an "energy store"), which can both receive energy for storage and output energy on an on-demand basis.

In this embodiment, the energy store 11 contains Lithium-based storage cells having a nominal charged voltage of approximately 3.7 V per cell (operating range of 2.1 V to 4.1 V), connected in series to provide a nominal energy store voltage of 400 volts (operating voltage range of approximately 300 V to 400 volts) with a storage capacity of between approximately 12 and 17 kilowatt-hours of electrical energy. Alternatively, the cells may be connected in series and parallel as needed to suit the application. For example, 28 modules with four series-connected cells per module could be connected in series and in parallel to provide an energy store with the same 17 kilowatt hours of stored energy as the first example above, but with a nominal operating voltage of 200 V volts and twice the current output of the first example.

In addition to the relatively high-capacity, low charge-discharge rate Lithium-based storage cells, the energy store 11 in this embodiment includes a number of relatively low-capacity, high charge-discharge rate of super capacitors to provide the energy store the ability over short periods to receive and/or discharge very large electrical currents that could not be handled by the Lithium-based storage cells (such cells being typically limited to charge/discharge rates of less than 1 C to only a few C).

Figure 2A:
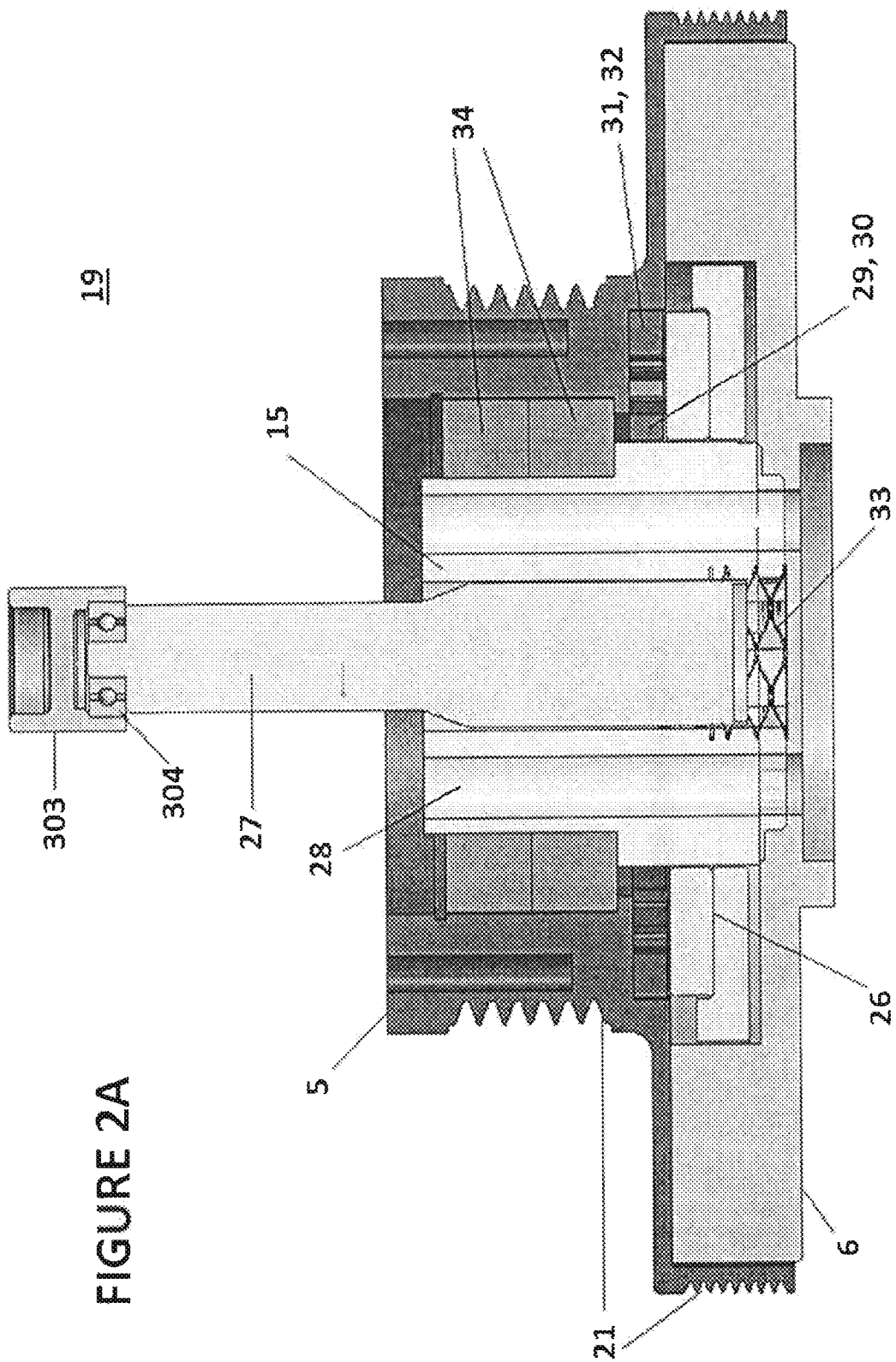
FIGS. 2A-2C are cross-section views of an embodiment of a clutch-pulley-damper and assembled FEMG components.
Figure 2B:
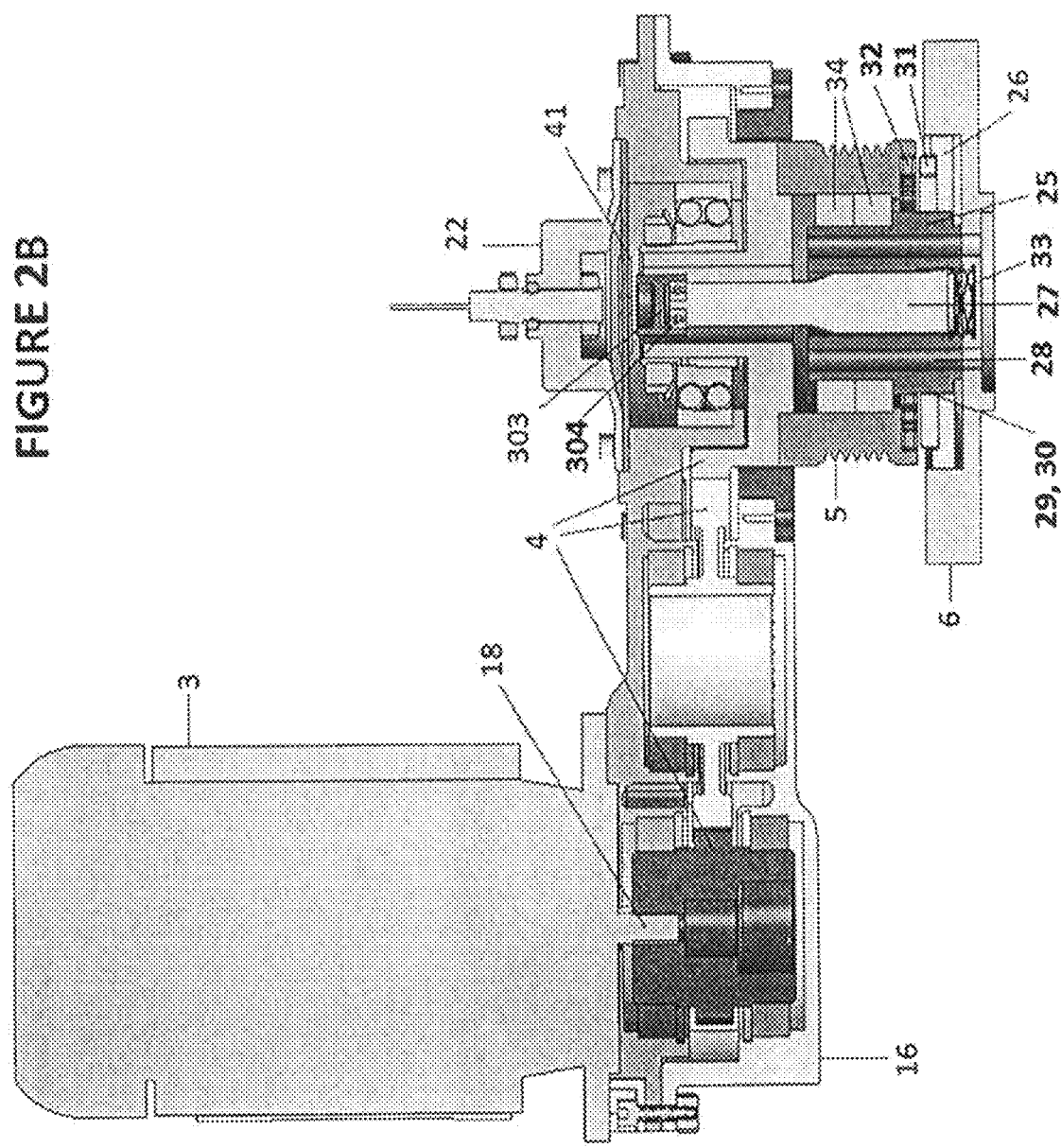
Figure 2C:
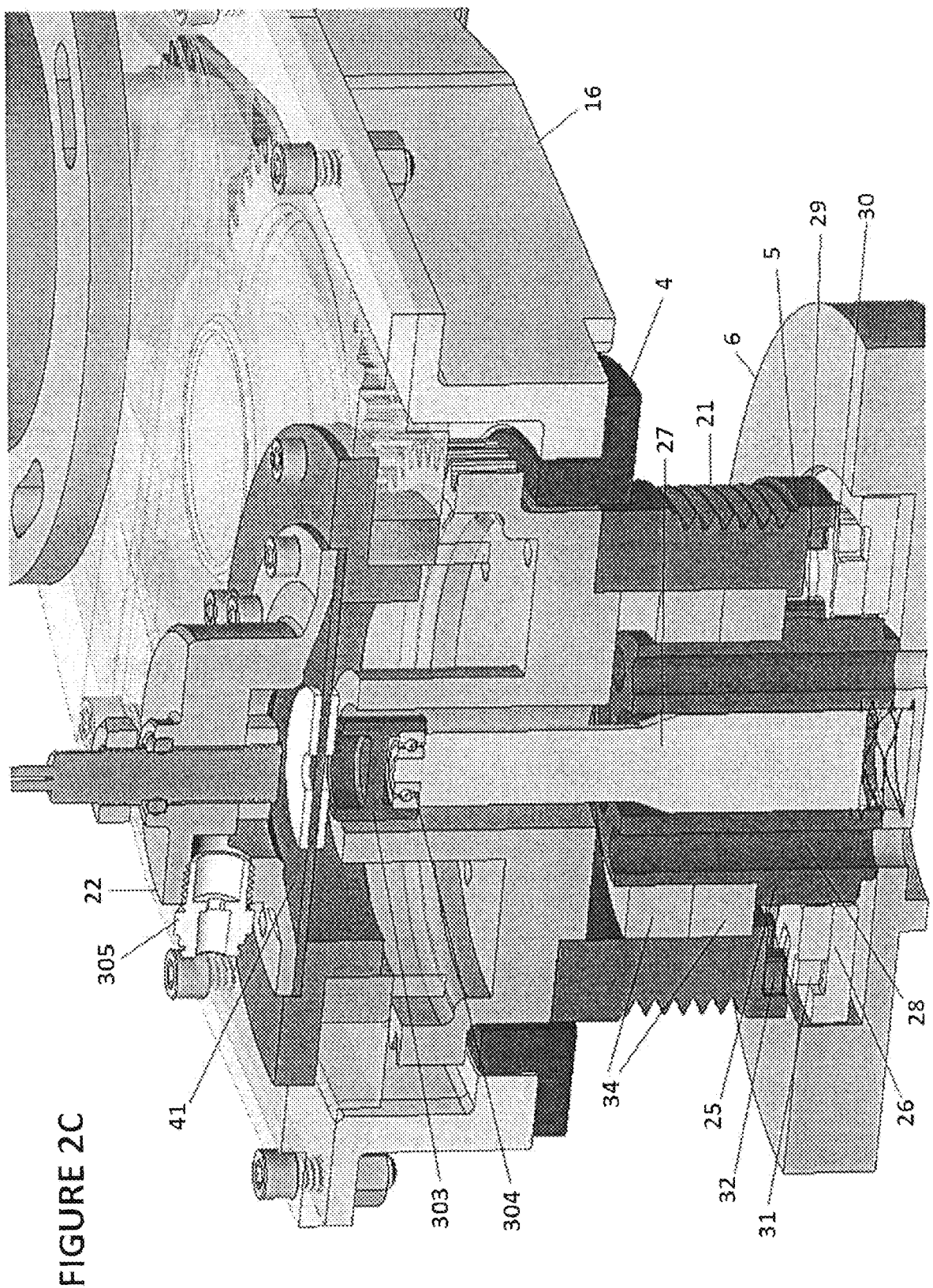
Figure 3A:
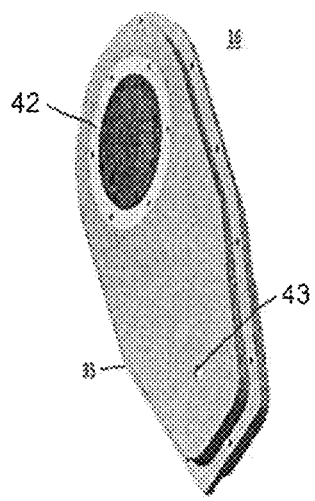
FIGS. 3A-3C are oblique views of an FEMG drive unit in the form of a single-plane gearbox.
Figure 3B:
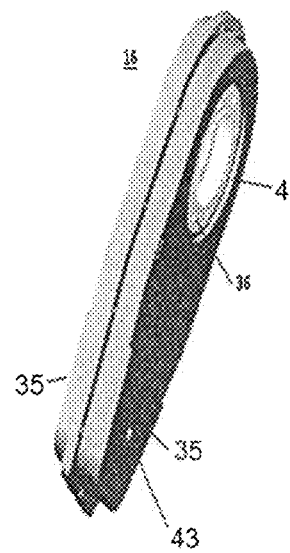
Figure 3C:
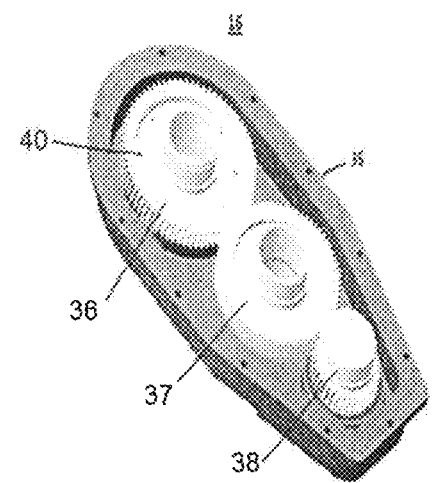
Figure 4:
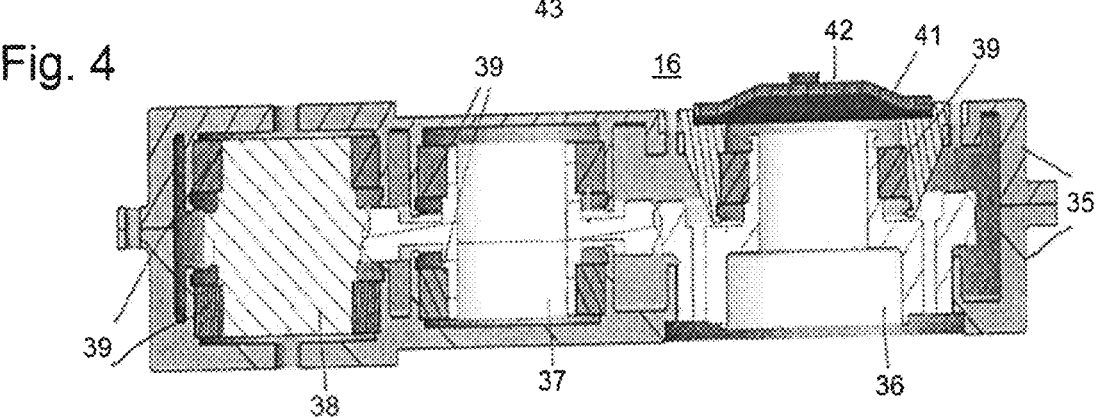
FIG. 4 is a cross-section view of the FEMG gearbox of FIGS. 6A-6C.

FIGS. 2A-2C show cross-section views of an embodiment of the clutch-pulley-damper unit 19 and of an assembled configuration of FEMG system hardware with this clutch-pulley-damper embodiment. In this embodiment the gearbox 16 containing reduction gears 4 receives the motor-generator 3 at a motor-generator end of the gearbox. The motor-generator 3 is secured to the housing of gearbox 16 with fasteners such as bolts (not illustrated). A rotor shaft 18 of the motor-generator 3 engages a corresponding central bore of the adjacent co-axially-located gear of the reduction gears 4 to permit transfer of torque between the motor-generator 3 and the reduction gears 4.

At the crankshaft end of the gearbox 16, the reduction gear 4 which is co-axially-aligned with the clutch-pulley-damper unit 19 is coupled for co-rotation to pulley side of the clutch-pulley-damper unit 19, in this embodiment by bolts (not shown) passing through the co-axial reduction gear 4. The engine-side portion of the coupling (the portion having the crankshaft damper 6) is configured to be coupled to the front end of the engine crankshaft by fasteners or other suitable connections that ensure co-rotation of the engine-side portion 6 with the crankshaft. As described further below, the gearbox 16 is separately mounted to a structure that maintains the clutch-pulley-damper unit 19 co-axially aligned with the front end of the engine crankshaft.

The cross-section view in FIG. 2B is a view from above the FEMG front end hardware, and the oblique cross-section view in FIG. 2C is a view at the crankshaft end of the gearbox 16. In this embodiment, the gearbox, motor-generator and clutch-pulley-damper unit assembly is arranged with the motor-generator 3 being located on the left side of the engine crankshaft and on the front side of the gearbox 16 (the side away from the front of the engine), where the motor-generator 3 may be located either in a space below or directly behind the vehicle's engine coolant radiator 20. Alternatively, in order to accommodate different vehicle arrangements the gearbox 16 may be mounted with the motor-generator 3 to the rear of the gearbox 16, preferably in a space laterally to the left side of the engine crankshaft (for example, adjacent to the oil pan at the bottom of the engine). The gearbox 16 further may be provided with dual-sided motor-generator mounting features, such that a common gearbox design may be used both in vehicle applications with a front-mounted motor-generator and vehicle applications with the motor-generator mounted to the rear side of the gearbox.

FIGS. 3A-3C and 4 are oblique and cross-section views of an embodiment of the FEMG gearbox 16 in which the gears across which torque is transferred between the switchable coupling 19 and the motor-generator 3 are aligned in a single plane (i.e., a parallel gearset). In this gearbox embodiment, a pair of gearbox clamshell-housing plates 35 enclose reduction gears 4, including a pulley-end gear 36, an idler gear 37 and a motor-generator-end gear 38. These gears have a drive ratio of 2:1, although any gear ratio which fits within the available space of a particular engine application while providing a desired ratio of crankshaft speed-to-motor-generator speed may be provided. The gears 36-38 may be spur gears, helical gears or have other gear teeth (such as double-helix herringbone gear teeth) as desired to suit the requirements of the particular FEMG system application. Such requirements include gear noise limitations needed to meet government noise emission or driver comfort limitations that might be met with helical gears, mechanical strength limitations, such as tooth stress limits, or axial thrust limits that might be meet with double-helix herringbone gear teeth which generate equal and opposite axial thrust components.

The gearbox housing rotatably supports each of reduction gears 36-38 with bearings 39. The pulley-end gear 36 includes a plurality of through-holes 40 in a circumferential ring inside its gear teeth corresponding to holes on the front face of the pulley 5 of the clutch-pulley-damper. These holes receive fasteners configured to rotationally fix the pulley-end reduction gear 36 to the pulley 5 for co-rotation when driven by the crankshaft and/or by the motor-generator.

The center of the pulley-end reduction gear 36 has a center aperture through which a pneumatically-powered dog-clutch actuating diaphragm 41 is located on a front face of the gearbox housing. The pneumatic diaphragm 41 axially extends and retracts a piston (not illustrated) arranged to engage the cup 27 on dog clutch element 26 to control engagement and disengagement of the clutch 15 of the clutch-pulley-damper unit 19. In this embodiment, the diaphragm 41 in FIGS. 3A-3C and 4 is arranged to engage and disengage the switchable coupling in response to admission of compressed air in the chamber above the front face of the diaphragm created when the cover plate 42 are installed over the diaphragm aperture at the front face of the gearbox housing. The admission and release of compressed air may controlled by solenoid valves (not illustrated) in response to commands from the FEMG control module 13. While the clutch actuation mechanism in this embodiment is a pneumatically-actuated diaphragm, the present invention is not limited to a particular clutch actuator. For example, an electro-mechanical actuator may be used, such as an electrically-powered solenoid configured to extend an actuator rod to disengage the clutch components.

At the motor-generator end of the gearbox 16, a shaft hole 43 aligned with the rotation axis of the motor-generator-end reduction gear 38 is provided in at least one of the housing clamshell plates 35, as shown in FIGS. 3A-3C and 4. The shaft hole 43 is sized to permit the rotor shaft of the motor-generator 3 (not illustrated in this figure) to enter the gearbox 16 and engage motor-generator-end gear 38 for co-rotation.

In the foregoing embodiments the end reduction gears 36, 38 are in constant-mesh engagement via idler gear 37. However, the invention is not limited to this type of single reduction parallel shaft gearbox. Rather, other torque power transmission arrangements are possible, such as chain or belt drives, or drives with components such as torque transfer shafts aligned at an angle to the switchable coupling's rotation axis (for example, a worm-gear drive with a transfer shaft rotating on an axis perpendicular to the switchable coupling's rotation axis), as long as they can withstand the torque to be transferred without needing to be so large that the axial depth of the gearbox becomes unacceptably large. Such alternative gearbox arrangements may also be used in embodiments in which the motor-generator 3 is not aligned parallel to the rotation axis of the switchable coupling, but instead is positioned on the gearbox 16 and aligned as necessary to facilitate installation in regions of limited space (for example, motor-generator being attached at the end of the gearbox with its rotation axis aligned with a gearbox torque transfer shaft that is not parallel to the switchable coupling's rotation axis).

Nor is the present invention limited to fixed reduction ratio constant-mesh arrangements, as other arrangements may be used, such as variable diameter pulleys (similar to those used in some vehicle constant velocity transmissions) or internally-disengageable gears, as long as the axial depth of the gearbox does not preclude the location of the FEMG system components in the region in front of the engine.

In a preferred embodiment, the reduction ratio of the FEMG gearbox reduction gears 36-38 is 2:1, a ratio selected to better match crankshaft rotation speeds to an efficient operating speed range of the motor-generator 3.

FIGS. 5A-5C, 6 and 7A-7B show features of another embodiment of the FEMG gearbox 16. In this embodiment, the gearbox housing 16 has an upper housing portion 16a and a lower housing portion 16b. FIG. 5A is a front elevation view of this FEMG gearbox embodiment, showing a diaphragm cover 42 mounted to upper housing portion 16a, co-axially aligned with the accessory drive pulley 5 (best shown in FIG. 5C), switchable coupling 19 and the torque source (in this embodiment, an internal combustion engine which is not shown in these figures).

The lower housing portion 16b in this embodiment is provided with three fastener bores 320 by which the lower housing portion 16b may be "clocked" to different orientations relative to the upper housing portion 16a, for example, offset to the left or right side of the upper housing portion.

As more readily seen in FIGS. 5B and 5C (oblique views from the front and rear of the gearbox housing, respectively), the lower housing portion 16b extends axially away from the plane of the drive gear 36 within the upper housing portion 16a. The laterally-offset end of the lower housing portion 16a receives and supports the motor-generator 3 axially and circumferentially offset from the upper housing portion and the drive gear coupled to the switchable coupling 19. FIG. 5B also shows an optional tie-rod 307 between the gearbox housing and chassis rail 49 providing additional support to the gearbox. If the tie-rod is used, it may be possible to omit other mounting devices, such as an engine-mounted gearbox support frame.

Figure 7A:
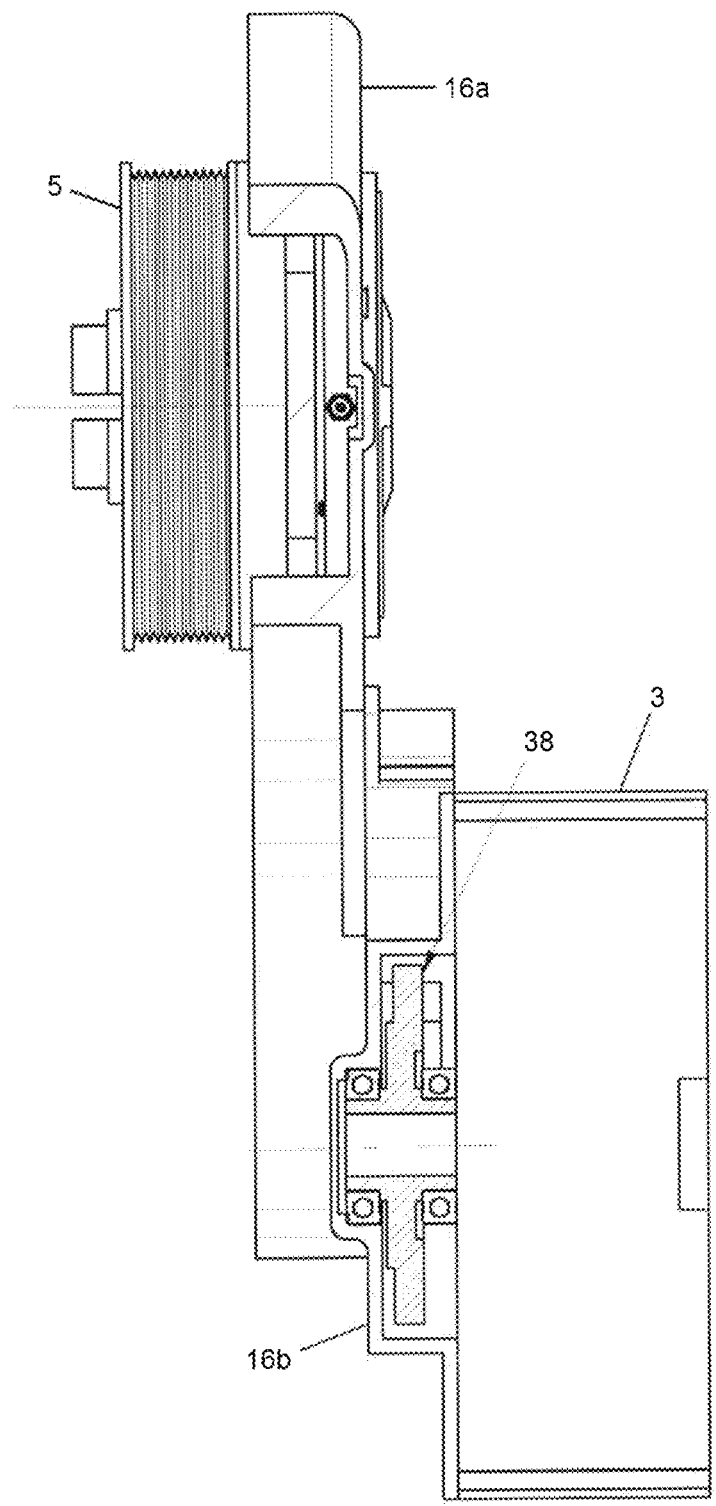
FIGS. 7A-7B are cross-section views of the offset FEMG gearbox of FIGS. 5A-5C.
Figure 7B:
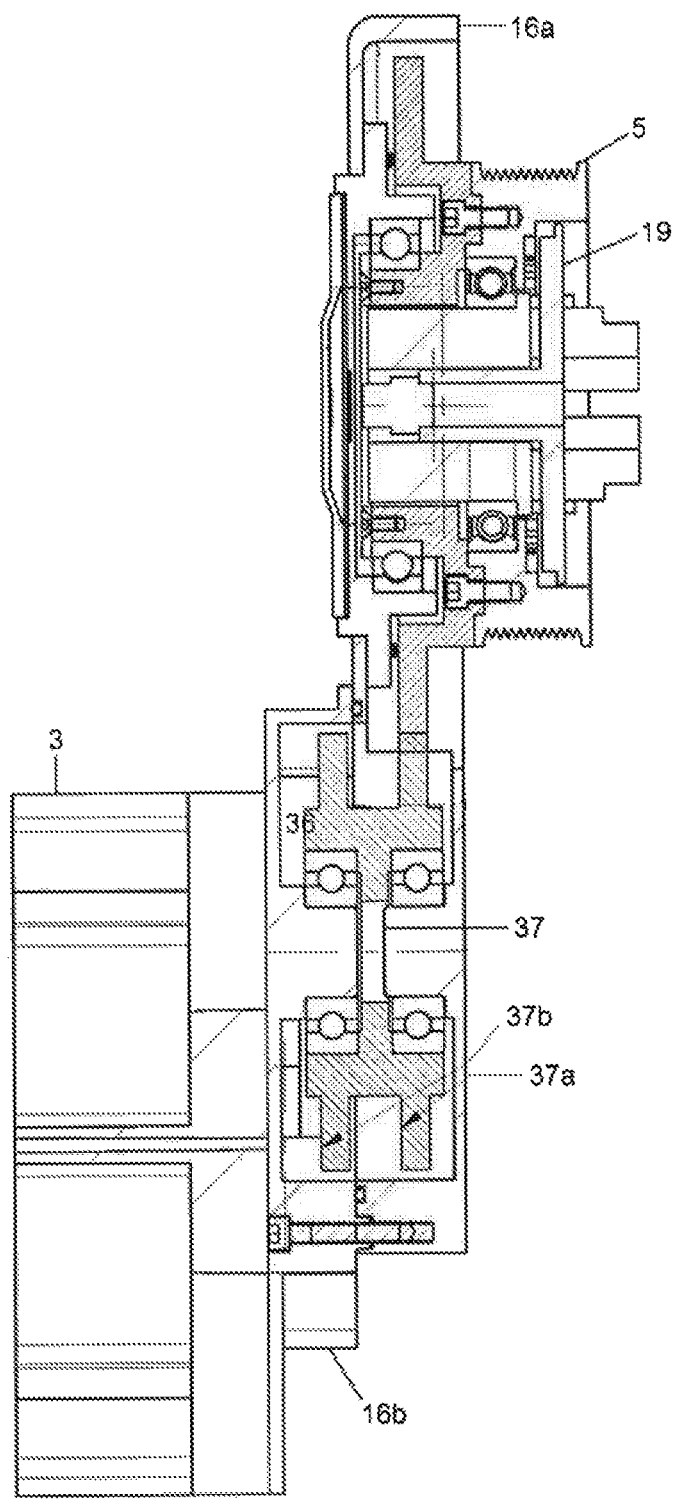

A particularly compact approach to providing torque transfer between the switchable coupling 19 and the axially-displaced motor-generator 3 is show in FIGS. 6 and 7A-7B (the motor-generator 3 is omitted from FIG. 3 for clarity). In this embodiment, the middle reduction gear 37 (aka, idler gear) is formed with two axially-separated gear sections (aka gearwheels) 37a, 37b. The idler gear section 37a engages the drive gear 36 in the same plane within upper housing portion 16a. The second idler gear section 37b engages the gear 38 at the motor-generator end of the lower housing portion 16b in a plane that is axially separate from the plane containing the first idler gear section 37a. The engagement of the idler gear section 37a and motor-generator gear 38 is illustrated in FIG. 6, in which the lower housing portion 16b is shown in outline. FIGS. 7A and 7B are complementary cross-section views, with FIG. 7A illustrating the location of the motor-generator gear 38 in the lower housing portion 16b, and FIG. 7B illustrating the arrangement of the driver gear 36 and the idler gear 37, with idler gear 37a engaged with driver gear 36 and idler gear section 37b located to engage the motor-generator gear 38 in FIG. 7A.

The location and arrangement of these gears is not limited to the present embodiment, for example, the idler gear may be located and supported by bearings in the lower housing portion 16b rather than in upper housing portion 16a, as long as the two idler gear portions 37a, 37b engage their respective gears 36, 38 when the housing portions are assembled together.

Nor is the present invention limited to a single double-row idler gear, as multiple idler gears may be provided between the driver gear 36 and the motor-generator 38 as needed to displace the motor-generator 3 axially and/or circumferentially enough to locate the motor-generator 3 in an available open space remote from the switchable coupling 19.

In addition to the ability to "clock" the lower housing portion 16b and motor-generator 3 by predetermined angles relative to the upper housing portion 16a, the upper housing portion 16a also may be provided with predetermined fastener mounting locations to permit the upper housing portion itself to be "clocked" relative to the torque source. Such an arrangement of mounting features would permit further flexibility in adapting the FEMG gearbox 16 to particularly space-constrained applications. For example, if a component or structure is located directly beneath the switchable coupling such that the gearbox upper housing portion could not be mounted projecting directly downward, the upper housing portion may be rotated about the rotation axis of the switchable coupling so that the upper housing portion 16a presents its mating surface with lower housing portion 16a at a location laterally offset from the switchable coupling rotation axis. The lower housing portion 16b may then be oriented into an available space into which the motor-generator 3 may project, for example, into a space directly below the mating surface or into a further laterally-spaced region.

The present invention's utility is enhanced by the use of "standardized" mounting features on both the upper and lower gearbox housing portions. This approach significantly lowers design costs by requiring only a limited number of gearbox housing portions to provide ready adaptation of the FEMG gearbox to a wide variety of applications. The approach also lowers production and inventory costs, and avoids additional costs and delays associated with the previous need to provide custom FEMG arrangements for each new application (for example, where an FEMG system designed to be installed in one vehicle manufacturer's engine bay of will not fit into the arrangements in another vehicle manufacturer's engine bay.

The idler gear between the drive gear and the motor-generator gear is not limited to a single gear. The idler gear with the two axially-separate gearwheels may be a part of an idler arrangement in which more than one idler gear couples the driver gear and the motor-generator gear for torque transfer. An example of such a torque transfer segment is shown schematically in FIG. 8.

In this embodiment, the upper gearbox housing portion 16a is elongated in order to incorporate a second, idler gear 37c between the driver gear 36 and the idler gear 37 in the same plane (in this illustration the idler gear idler gear 37c has two parallel sections, each of which engages the corresponding idler gear section 37a and idler gear section 37b). Such a multi-gear idler arrangement provides the ability to extend the gearbox housing in order to locate the motor generator gear 38 and the motor-generator on housing portion 16b in a space relatively remote from the drive gear. In particular, the elongation of the upper housing portion 16a and the use of one or more additional idler gears in series enables the upper housing portion to remain relatively narrow (i.e., avoids an undesirably large idler gear 37 and accompanying large housing width if a single idler gear had to span the distance between the drive gear and the motor-generator gear 38). As a result, the upper housing portion 16a is better able to avoid nearby interferences while still being able to support the lower housing portion 16b and its motor-generator gear 38 in a space relatively remote from the drive gear.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 air compressor
2 air conditioning compressor
3 motor-generator
4 drive unit gears
5 pulley
6 damper
7 engine cooling fan
8 engine
9 vehicle batteries
10 DC/DC converter
11 energy store
12 battery management system
13 FEMG electronic control unit
14 AC/DC power inverter
15 clutch
16 gearbox
16a upper gearbox housing portion
16b lower gearbox housing portion
18 rotor shaft
19 clutch-pulley-damper unit
20 engine coolant radiator
21 belt drive portions
22 clutch actuator
25, 26 dog clutch elements
27 clutch throw-out rod
28 bolt holes
29 external splines
30 internal splines
31, 32 dogs
33 spring
34 bearings
35 gearbox housing clamshell
36 pulley-end reduction gear
37 middle reduction gear
37a idler gear section
37b idler gear section
37c additional idler gear
38 motor-generator-end reduction gear
39 bearings
41 diaphragm
42 cover
43 shaft hole
49 chassis rail
303 clutch throw-out rod bushing
304 bushing bearing
305 compressed air fitting
307 tie rod
320 fastener bores

What is claimed is:

1. A torque transfer segment, comprising:
a gearbox housing having a first housing portion and a second housing portion configured to be coupled to the first housing portion at corresponding first housing sections;
a drive gear at a second section of the first housing portion, the drive gear being configured to be co-axially coupled for rotation with a switchable coupling;

a motor-generator gear at a second section of the second housing portion, the motor-generator gear being configured to be co-axially coupled with a motor-generator;
an idler gear arrangement including at least one idler gear, the idler gear arrangement configured to transfer torque between the drive gear and the motor-generator gear, wherein
at least a portion of the idler gear arrangement is located at the first housing sections of the housing portions when the first housing portion is coupled to the second housing portion,
the first housing portion and the second housing portion are configured to be coupled together in a plurality of orientations relative to one another about a rotation axis of the at least one idler gear,
the at least one idler gear having at least two gearwheels axially separate from one another along the rotation axis of the at least one idler gear, and
when the first housing portion and the second housing portion are coupled together, a plane perpendicular to a rotation axis of the drive gear is axially offset from a plane perpendicular to a rotation axis of the motor-generator gear.

2. The torque transfer segment of claim 1, wherein
the idler gear arrangement includes at least one additional gearwheel in addition to the at least two axially-separate gearwheels, and
the gearwheels of the idler gear arrangement are arranged to transfer torque between the drive gear and the motor-generator gear.

3. The torque transfer segment of claim 1, wherein
the first housing sections of the first housing portion and the second housing portion include corresponding fastener mounting features in a predetermined pattern, the mounting features being arranged such that the first housing portion and the second housing portion are coupleable at a plurality of orientations about the idler gear rotation axis at fixed angular offsets.

4. The torque transfer segment of claim 3, wherein
the fixed angular offset is in a range from 45° to 120°.

5. The torque transfer segment of claim 3, wherein
the fixed angular offset is 120°.

6. The torque transfer segment of claim 1, wherein
the first housing portion includes gearbox housing mounting features configured such that the first housing portion is mountable at a plurality of orientations relative to a torque source coupled to the switchable coupling about a rotation axis of the switchable coupling.

7. The torque transfer segment of claim 6, wherein
at least one of the first and second housing portions includes separate support mounting features configured to be coupled to a support separate from the torque source.

8. The torque transfer segment of claim 7, wherein
the separate support mounting features are configured to be coupled to a tie-rod.

9. The torque transfer segment of claim 6, wherein
the torque source is an internal combustion engine.

10. A front end motor-generator system, comprising:
a torque source configured to supply torque to a torque consumer;
a motor-generator;
a torque transfer segment having a motor-generator end configured to receive the motor-generator and to transfer torque between the motor-generator end and a coupling end of the torque transfer segment; and
an integrated switchable coupling having a coupling rotation axis arranged co-axially with a rotation axis of the torque source, the integrated switchable coupling being located between the coupling end of the torque transfer segment and the torque source, the integrated switchable coupling including
an torque source-side portion coupled to the torque source,
a drive-side portion coupled to the torque transfer segment coupling end, and
an engagement actuator configured to selectively engage the torque source-side portion with the drive-side portion, at least a portion of the engagement actuator being concentrically surrounded by the drive-side portion along the coupling rotation axis;
an accessory drive arranged to be driven by the drive-side portion of the integrated switchable coupling and to drive at least one accessory;
an energy storage system, the energy storage system including
an energy store configured to store electrical energy generated by the motor-generator and to deliver stored electrical energy to the motor-generator to generate torque output from the motor-generator to the integrated switchable coupling, and
an electrical energy conversion and distribution network configured to convert a current type of the electrical energy transferred between the motor-generator and the energy store between alternating current and direct current when the electrical energy is transferred from the motor-generator to the energy store and between direct current and alternating current when the electrical energy is transferred from the energy store to the motor-generator; and
a front end motor-generator system controller configured to switch the engagement actuator between engaged and disengaged states and control operation of the electrical energy conversion and distribution network during transfer of the electrical energy between the motor-generator and the energy store,
wherein the torque transfer segment includes
a gearbox housing having a first housing portion at the coupling end of the torque transfer segment and a second housing portion at the motor-generator end of the torque transfer segment, the second housing portion being configured to be coupled to the first housing portion at corresponding first housing sections;
a drive gear at a second section of the first housing portion, the drive gear being configured to be co-axially coupled for rotation with a switchable coupling;
a motor-generator gear at a second section of the second housing portion, the motor-generator gear being configured to be co-axially coupled with the motor-generator;
an idler gear arrangement including an idler gear, the idler gear arrangement being configured to transfer torque between the drive gear and the motor-generator gear,
the idler gear is located at the first housing sections of the housing portions when the first housing portion is coupled to the second housing portion, the first housing portion and the second housing portion are configured to be coupled together in a plurality of orientations relative to one another about a rotation axis of the idler gear, the idler gear includes at least two gearwheels axially separate from one another along the rotation axis of the idler gear, and when the first housing portion and the second housing portion are coupled together, a plane perpendicular to a rotation axis of the drive gear is axially offset from a plane perpendicular to a rotation axis of the motor-generator gear.

11. The front end motor generator system of claim 10, wherein the idler gear arrangement includes at least one additional gearwheel in addition to the at least two axially-separate gearwheels, and the gearwheels of the idler gear arrangement are arranged to transfer torque between the drive gear and the motor-generator gear.

12. The front end motor generator system of claim 10, wherein the first housing sections of the first housing portion and the second housing portion include corresponding fastener mounting features in a predetermined pattern, the mounting features being arranged such that the first housing portion and the second housing portion are coupleable at a plurality of orientations about the idler gear rotation axis at fixed angular offsets.

13. The front end motor generator system of claim 12, wherein the fixed angular offset is in a range from 45° to 120°.

14. The front end motor generator system of claim 12, wherein the fixed angular offset is 120°.

15. The front end motor generator system of claim 10, wherein the first housing portion includes gearbox housing mounting features configured such that the first housing portion is mountable at a plurality of orientations relative to the torque source coupled to the integrated switchable coupling about the rotation axis of the integrated switchable coupling.

16. The front end motor generator system of claim 15, wherein at least one of the first and second housing portions includes separate support mounting features configured to be coupled to a support separate from the torque source.

17. The front end motor generator system of claim 16, wherein the separate support mounting features are configured to be coupled to a tie-rod.

18. The front end motor generator system of claim 15, wherein the torque source is an internal combustion engine, the torque consumer is a driveline arranged to propel a vehicle, the internal combustion engine is configured to deliver torque to the vehicle driveline from an end of an engine crankshaft having an engine flywheel, and the integrated switchable coupling is located between the coupling end of the torque transfer segment and an end of the engine crankshaft opposite the flywheel end.

19. A torque transfer segment, comprising:

a gearbox housing having a first housing portion and a second housing portion configured to be coupled to the first housing portion at corresponding first housing sections;

a drive gear at a second section of the first housing portion, the drive gear being configured to transfer torque to an accessory drive;

a motor-generator gear at a second section of the second housing portion, the motor-generator gear being configured to be co-axially coupled with a motor-generator;

an idler gear arrangement including an idler gear, the idler gear arrangement being configured to transfer torque between the drive gear and the motor-generator gear, wherein the idler gear is located at the first housing sections of the housing portions when the first housing portion is coupled to the second housing portion, the first housing portion and the second housing portion are configured to be coupled together in a plurality of orientations relative to one another about a rotation axis of the idler gear, the idler gear includes at least two gearwheels axially separate from one another along the rotation axis of the idler gear, and when the first housing portion and the second housing portion are coupled together, a plane perpendicular to a rotation axis of the drive gear is axially offset from a plane perpendicular to a rotation axis of the motor-generator gear.

20. The torque transfer segment of claim 19, wherein the accessory drive includes an accessory belt drive pulley coupled for co-axial rotation with the drive gear.

* * * * *